United States Patent
Matsumoto et al.

(10) Patent No.: US 10,657,654 B2
(45) Date of Patent: May 19, 2020

(54) ABNORMALITY DETECTION DEVICE AND ABNORMALITY DETECTION METHOD

(71) Applicant: DENSO TEN Limited, Kobe-shi, Hyogo (JP)

(72) Inventors: Takeo Matsumoto, Kobe (JP); Kohji Ohnishi, Kobe (JP); Naoshi Kakita, Kobe (JP); Takayuki Ozasa, Kobe (JP); Tomoyuki Fujimoto, Kobe (JP); Teruhiko Kamibayashi, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 113 days.

(21) Appl. No.: 16/137,011

(22) Filed: Sep. 20, 2018

(65) Prior Publication Data

US 2019/0206060 A1    Jul. 4, 2019

(30) Foreign Application Priority Data

Dec. 28, 2017  (JP) ................ 2017-253751
Dec. 28, 2017  (JP) ................ 2017-253756
Jan. 10, 2018  (JP) ................ 2018-001726

(51) Int. Cl.
| | | |
|---|---|---|
| *G06K 9/00* | (2006.01) | |
| *G06T 7/20* | (2017.01) | |
| *G06T 7/00* | (2017.01) | |
| *G06T 7/70* | (2017.01) | |

(52) U.S. Cl.
CPC .............. *G06T 7/20* (2013.01); *G06T 7/0002* (2013.01); *G06T 7/0004* (2013.01); *G06T 7/70* (2017.01); *G06T 7/97* (2017.01); *G06T 2207/10016* (2013.01); *G06T 2207/30252* (2013.01)

(58) Field of Classification Search
CPC ........... G06T 7/20; G06T 7/0004; G06T 7/70; G06T 7/0002; G06T 7/97; G06T 2207/30252; G06T 2207/10016
See application file for complete search history.

(56) References Cited

U.S. PATENT DOCUMENTS

| | | | |
|---|---|---|---|
| 9,756,248 B1* | 9/2017 | Wu | G06T 5/003 |
| 2012/0314073 A1* | 12/2012 | Shimoda | G06T 7/80 |
| | | | 348/148 |
| 2013/0101230 A1* | 4/2013 | Holeva | B66F 9/122 |
| | | | 382/202 |
| 2017/0067739 A1* | 3/2017 | Siercks | H04N 5/2252 |
| 2018/0025235 A1* | 1/2018 | Fridman | G01C 21/28 |
| | | | 382/103 |

(Continued)

FOREIGN PATENT DOCUMENTS

| | | | |
|---|---|---|---|
| JP | H10-132939 A | 5/1998 | |
| JP | 2000-031162 A | 1/2000 | |

(Continued)

*Primary Examiner* — Samir A Ahmed
(74) *Attorney, Agent, or Firm* — Oliff PLC

(57) ABSTRACT

An abnormality detection device includes: an estimator which estimates the amount of movement of a mobile body based on an image taken by a camera mounted on the mobile body; and a determiner which determines an abnormality in the camera by obtaining estimated information on the amount of movement of the mobile body as obtained in the estimator and actually observed information on the movement of the mobile body as detected by an external sensor, other than the camera, mounted on the mobile body.

26 Claims, 14 Drawing Sheets

(56) References Cited

U.S. PATENT DOCUMENTS

2018/0204334 A1* 7/2018 Smith ................ G06T 7/292
2018/0292201 A1* 10/2018 Sakano ................ H04N 7/18

FOREIGN PATENT DOCUMENTS

| JP | 2004-338637 A | 12/2004 |
| JP | 2006-031162 A | 2/2006 |
| JP | 2006-153778 A | 6/2006 |
| JP | 2017-111683 A | 6/2017 |

* cited by examiner

[Fig.1]
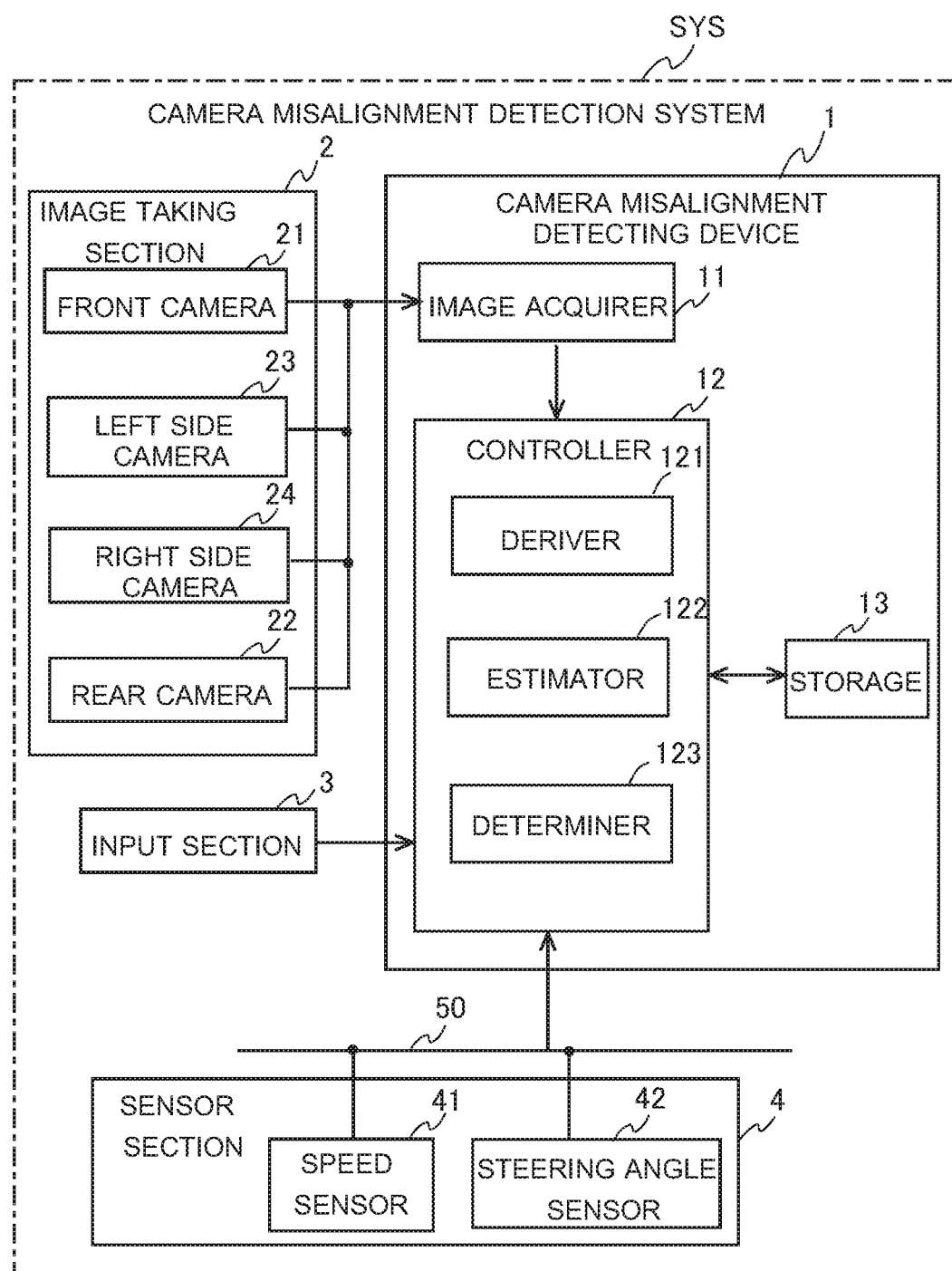

[Fig.2]
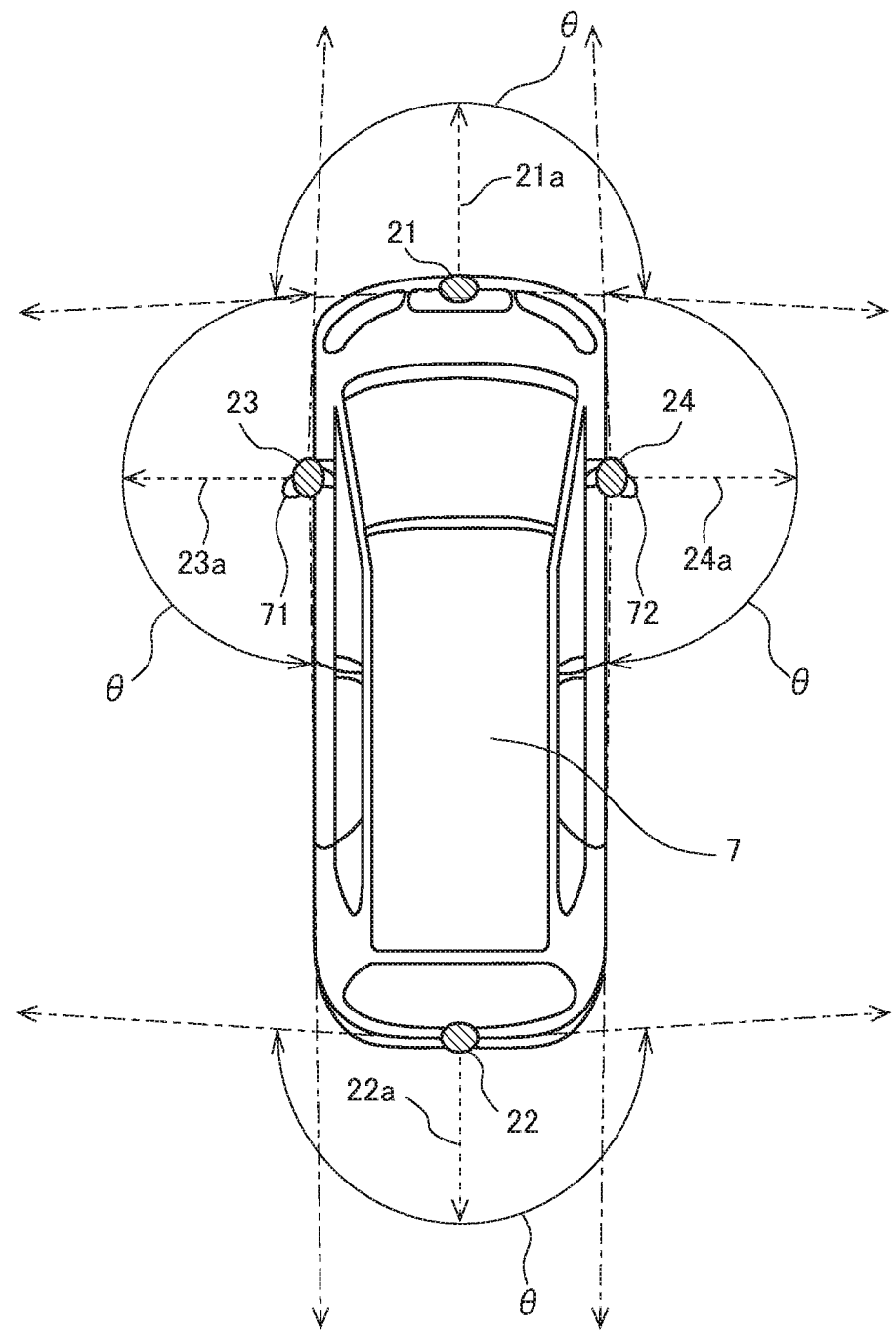

[Fig.3]
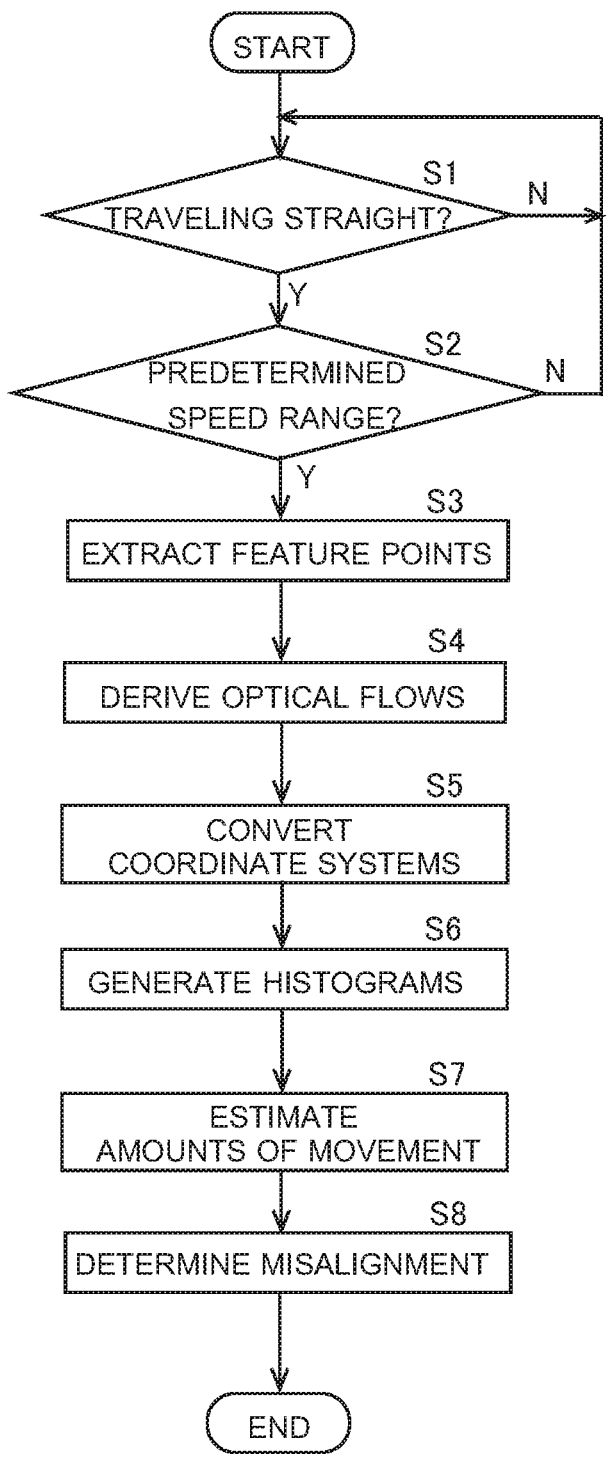

[Fig.4]
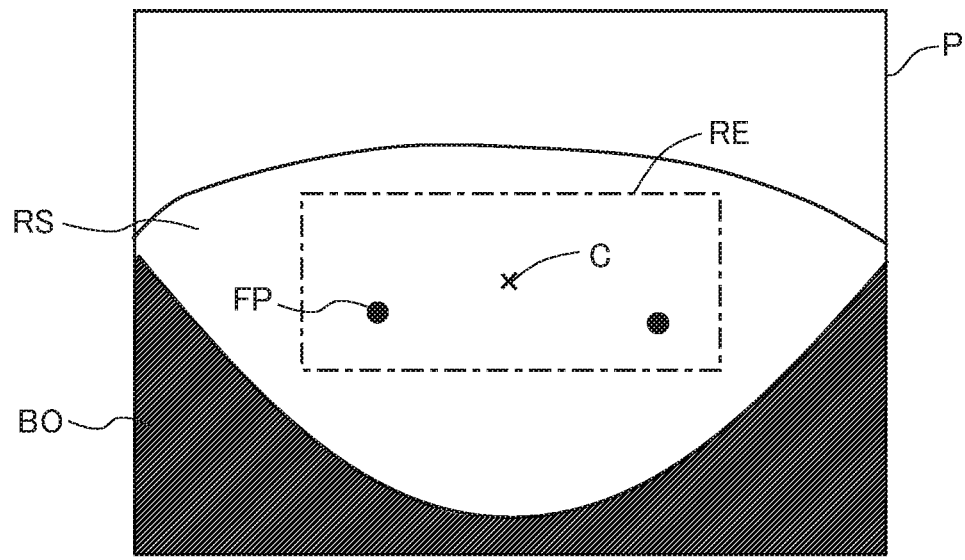
[Fig.5]
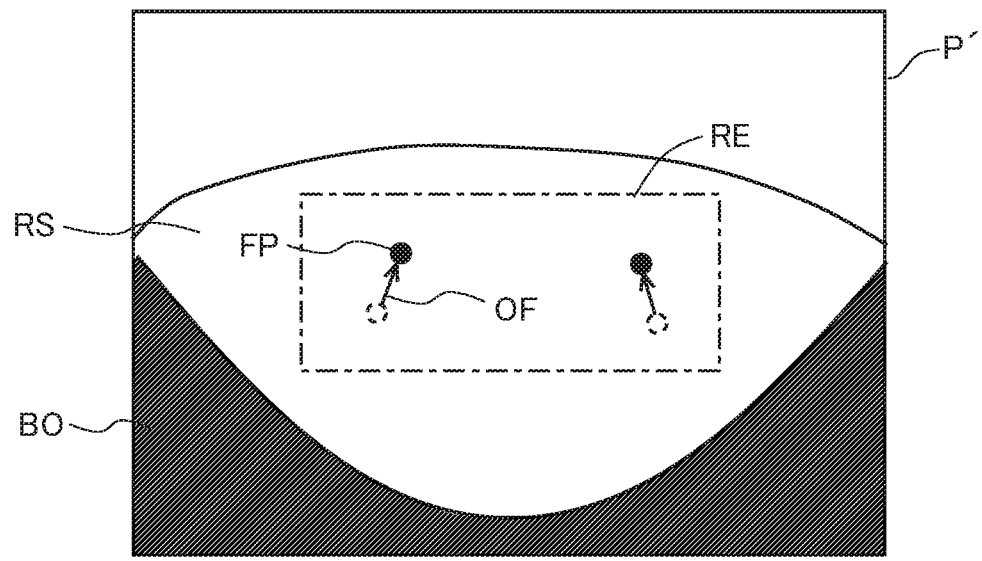

[Fig.6]
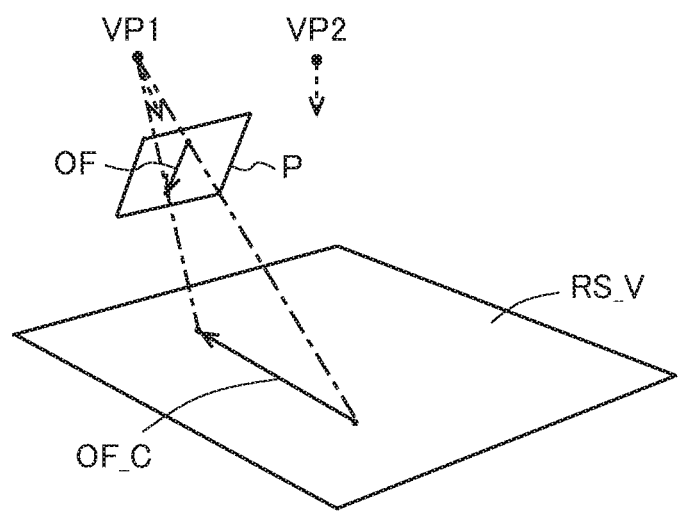
[Fig.7]
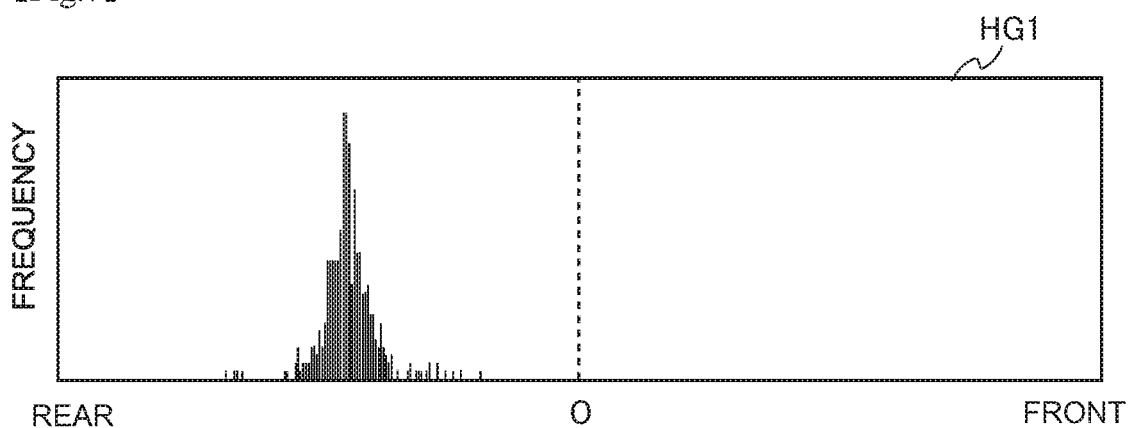
[Fig.8]
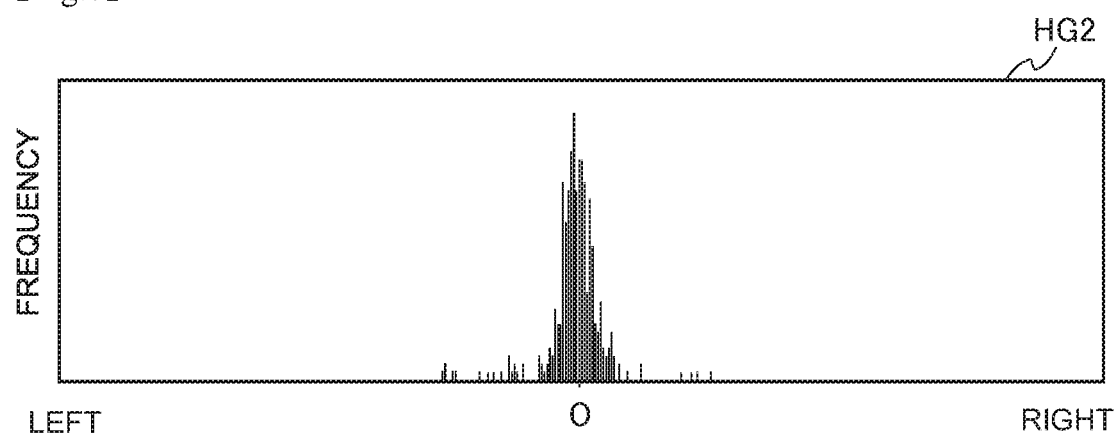

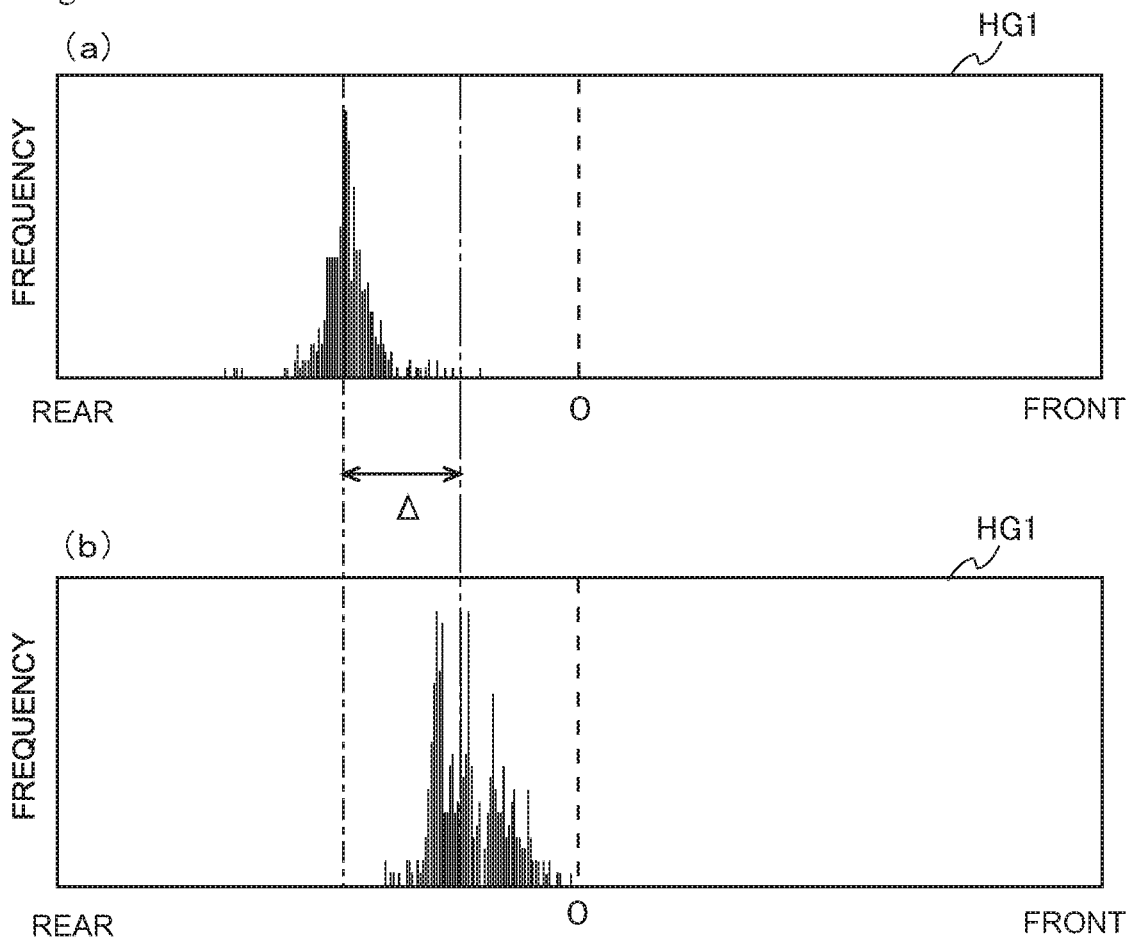

[Fig.10]
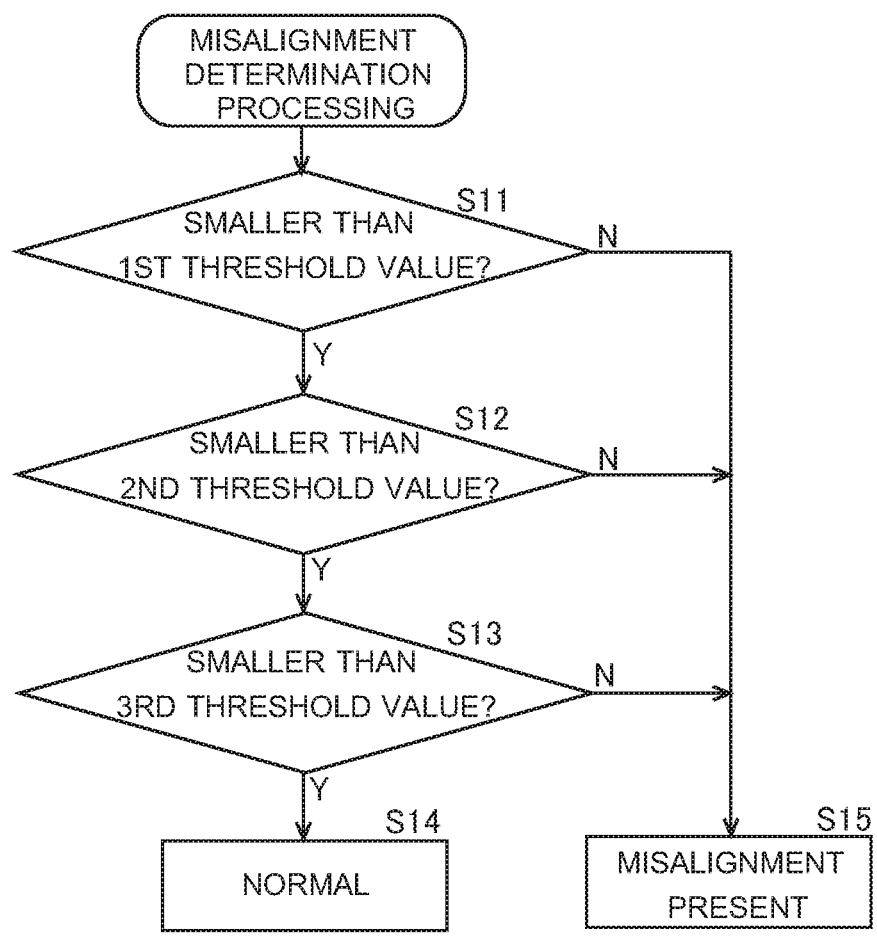

[Fig.11]
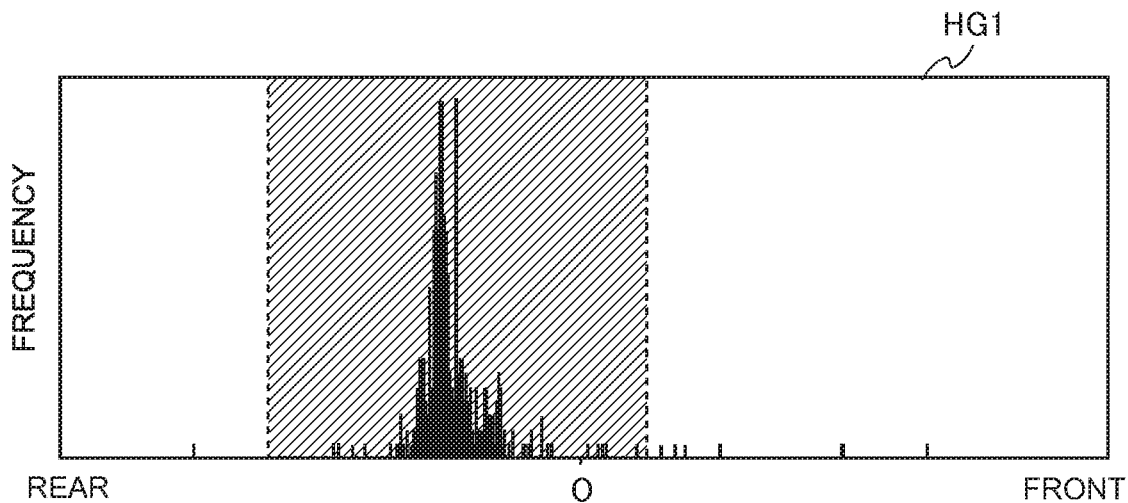
[Fig.12]
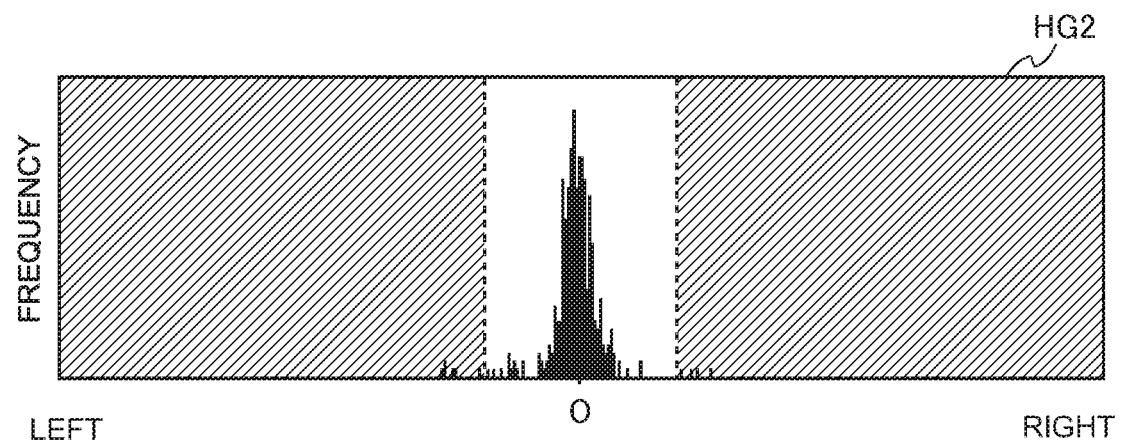

[Fig.13]
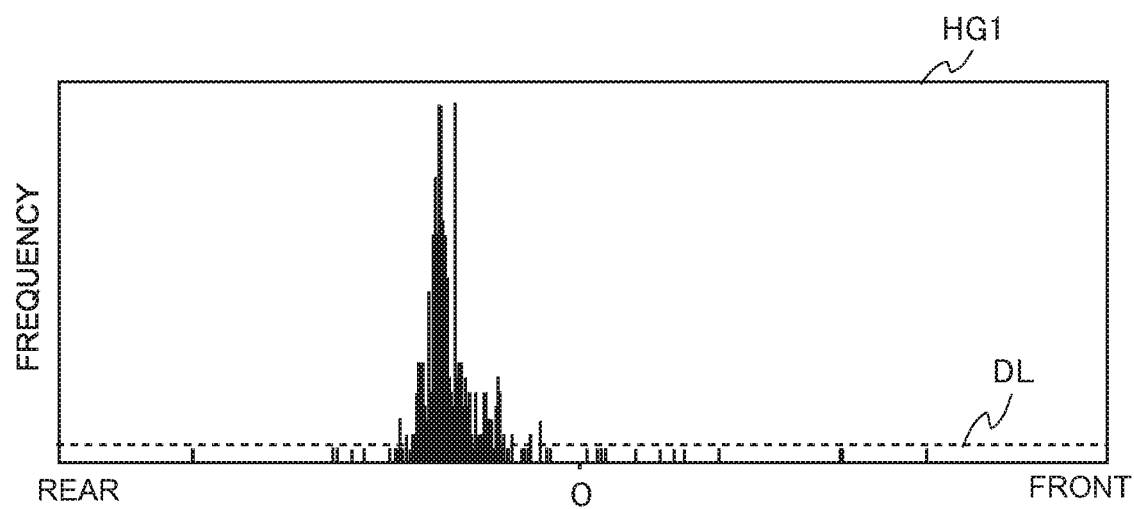
[Fig.14]
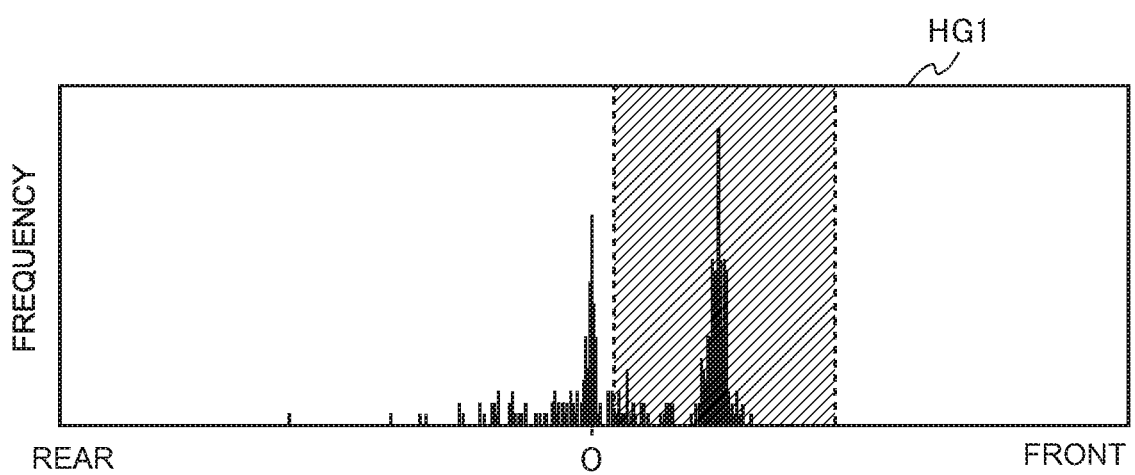

[Fig.15]
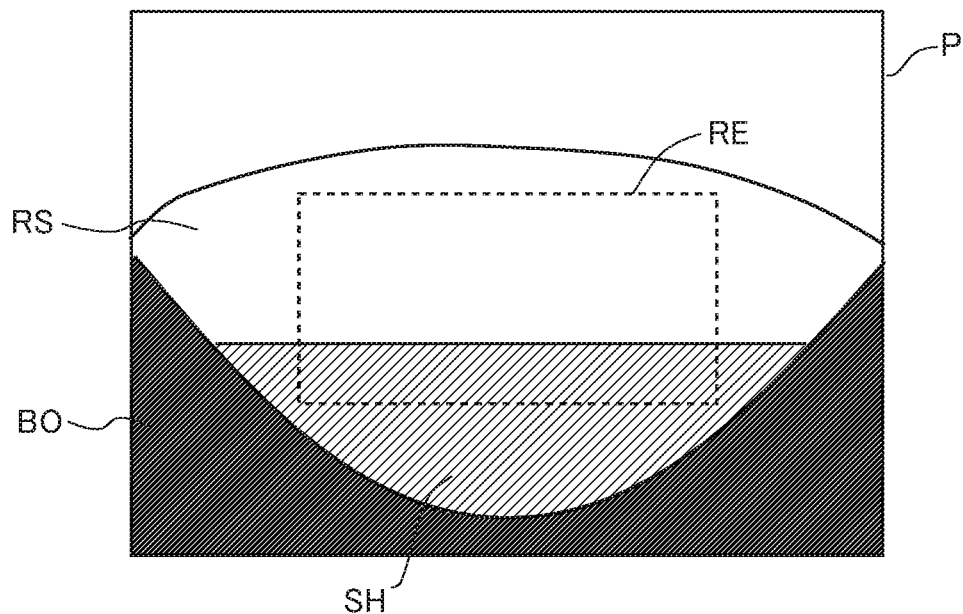
[Fig.16]
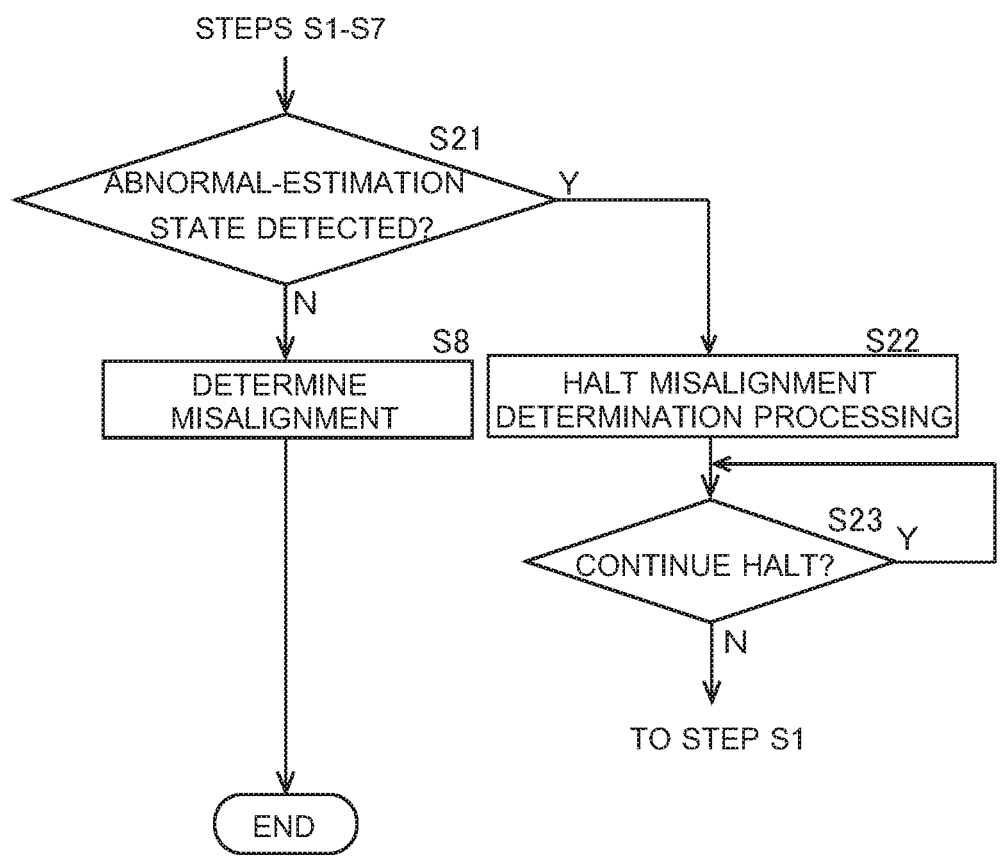

[Fig.17]
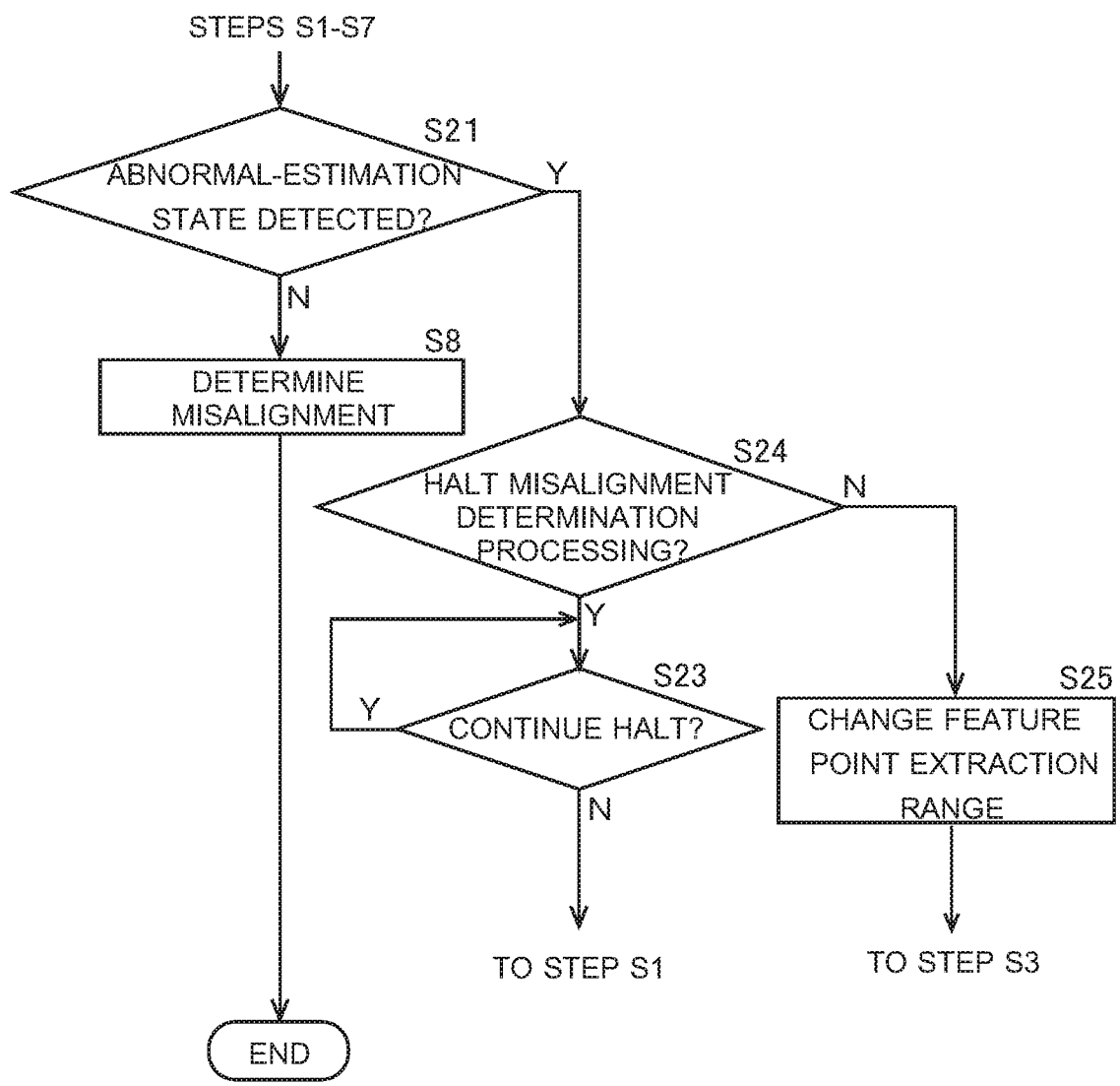

【Fig.18】
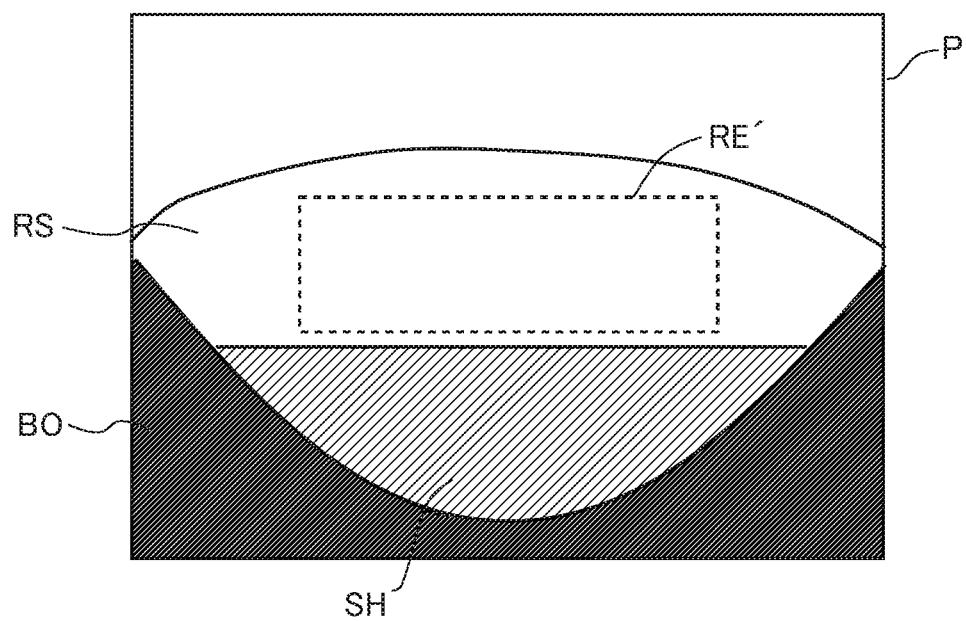
【Fig.19】
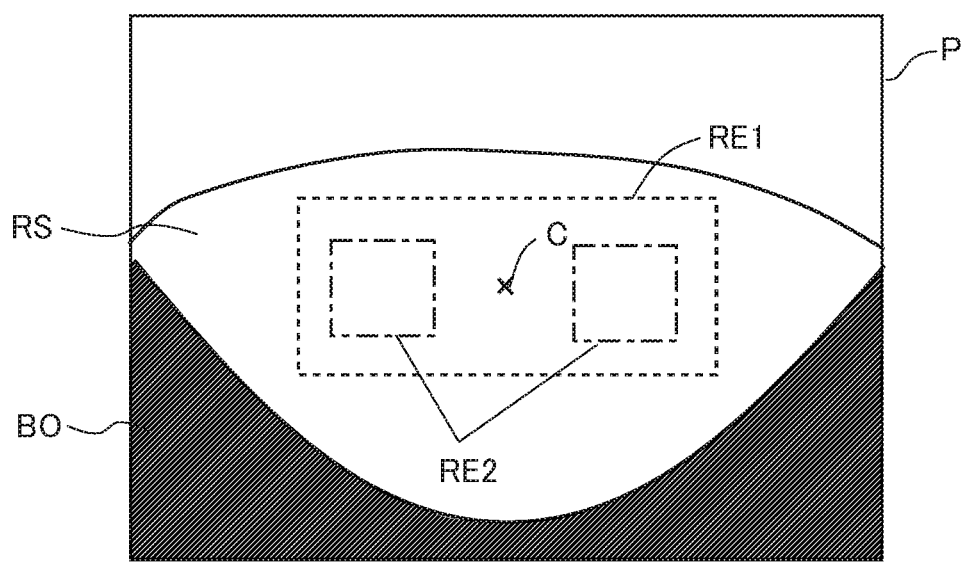

[Fig.20]
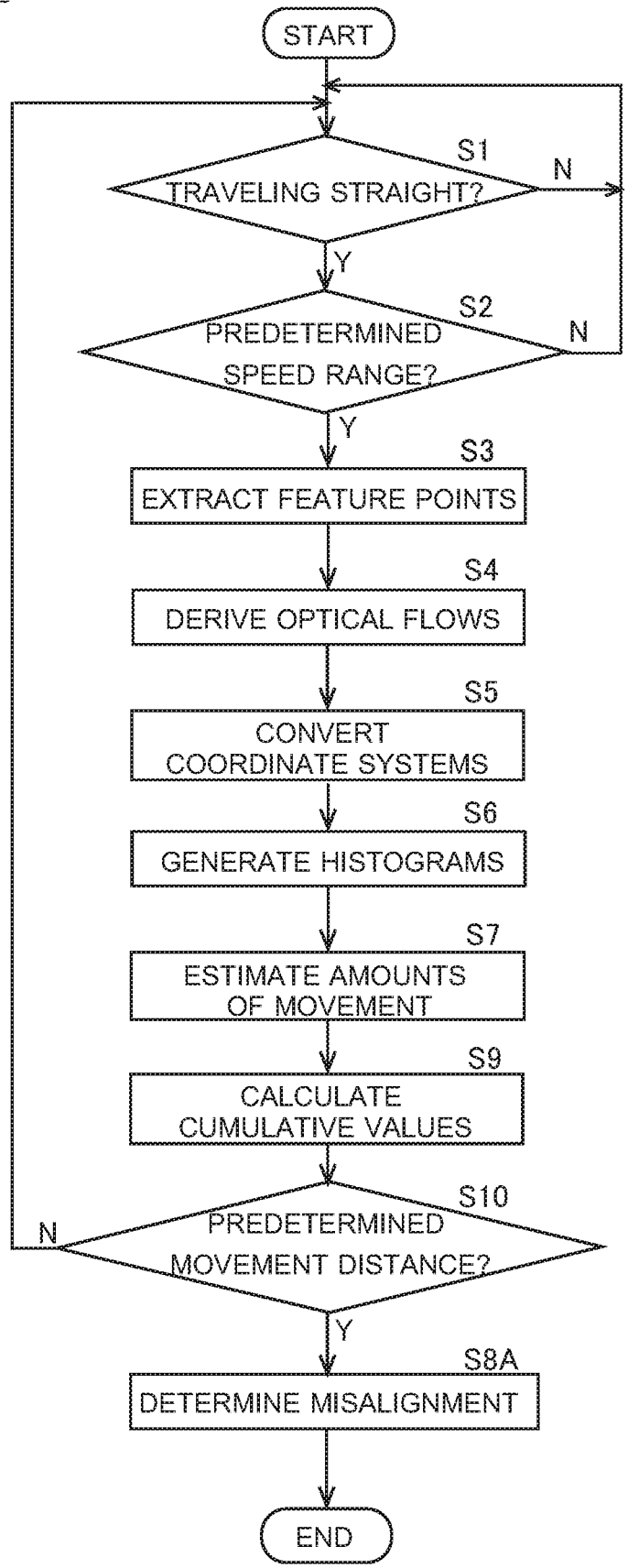

[Fig.21]
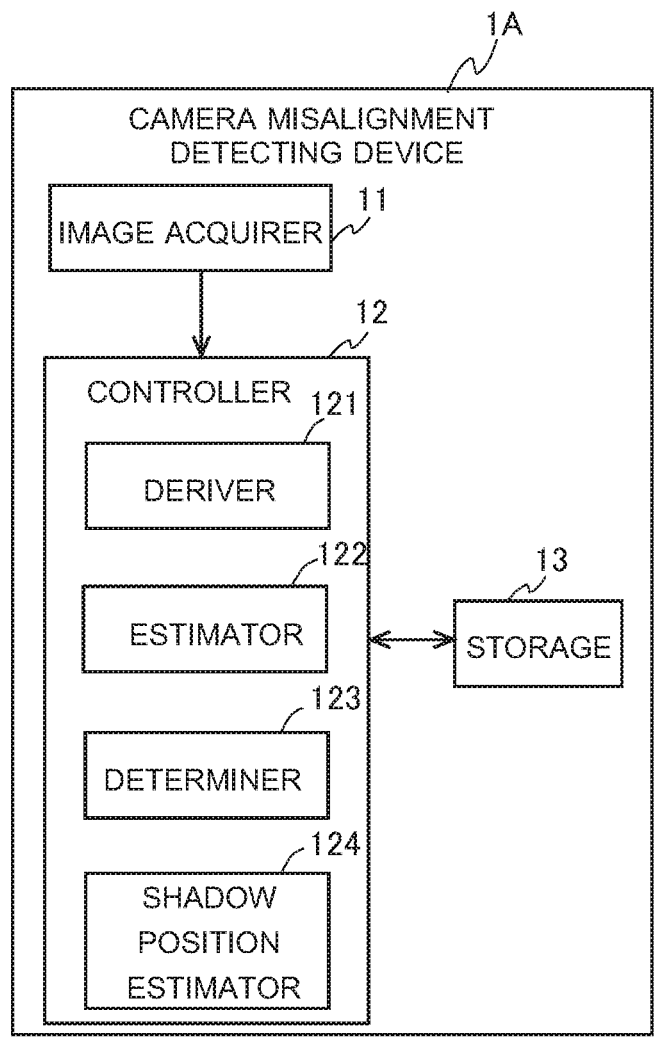
[Fig.22]
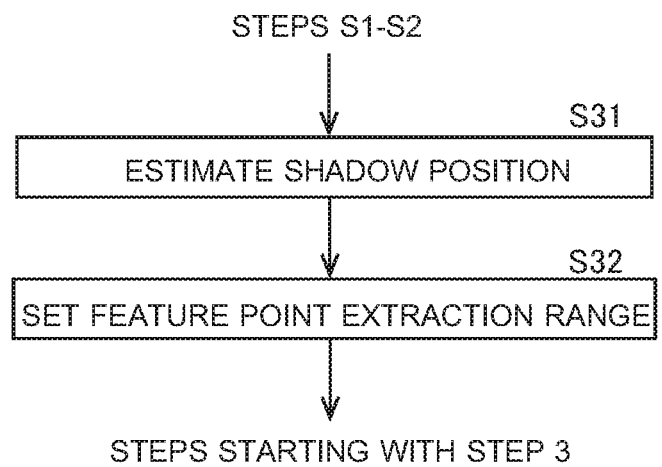

ABNORMALITY DETECTION DEVICE AND ABNORMALITY DETECTION METHOD

CROSS-REFERENCE TO RELATED APPLICATIONS

This application is based on Japanese Patent Applications Nos. 2017-253751 and 2017-253756 filed on Dec. 28, 2017 and Japanese Patent Application No. 2018-001726 filed on Jan. 10, 2018, the contents of all of which are hereby incorporated by reference.

BACKGROUND OF THE INVENTION

1. Field of the Invention

The present invention relates to abnormality detecting devices and abnormality detecting methods.

2. Description of Related Art

Conventionally, cameras mounted on mobile bodies such as vehicles (hereinafter referred to as vehicle-mounted cameras) are used to achieve driving assistance, such as parking assistance, for vehicles. A vehicle-mounted camera is fitted to a vehicle in a state fixed to it, for example, before the shipment of the vehicle from the factory. However, due to, for example, inadvertent contact and secular change, a vehicle-mounted camera can develop an abnormality in the form of a misalignment from the installed state at the time of factory shipment. A deviation in the installation position and angle of a vehicle-mounted camera can produce an error in the amount of steering and the like determined by use of a camera image, and thus it is important to detect a misalignment in how the vehicle-mounted camera is installed.

JP-A-2006-153778 discloses a technology for detecting a misalignment among the optical axes of a plurality of imaging means. Specifically, according to what is disclosed there, the offset for a parallax ascribable to a relative misalignment between the optical axes of two cameras is given a value commensurate with the deviation between the change over a predetermined period of the distance to a still target object as sensed with each camera while a vehicle is traveling straight and the amount of movement of the vehicle during the predetermined period as sensed by a navigation device or the like.

On the other hand, JP-A-2006-31162 discloses a technology for detecting the presence of a moving obstacle without being affected by noise and with high accuracy based on the optical flows of feature points on an image taken with a camera.

SUMMARY OF THE INVENTION

With the optical axis misalignment detecting means disclosed in JP-A-2006-153778, it is possible to detect a misalignment between the optical axes of two cameras that are disposed with their respective optical axes parallel to each other. However, with this optical axis misalignment detecting means, it is not possible to detect a misalignment of a single vehicle-mounted camera from its installed state at the time of factory shipment.

An object of the present invention is to provide a technology that permits proper detection of an abnormality such as a deviation in the installation position and angle of a camera mounted on a mobile body such as a vehicle.

An abnormality detection device illustrative of the present invention includes an estimator configured to estimate the amount of movement of a mobile body based on an image taken by a camera mounted on the mobile body. An abnormality detection device illustrative of the present invention further includes a determiner configured to determine an abnormality in the camera by obtaining estimated information on the amount of movement of the mobile body as obtained in the estimator and actually observed information on the movement of the mobile body as detected by an external sensor, other than the camera, mounted on the mobile body.

BRIEF DESCRIPTION OF THE DRAWINGS

FIG. 1 is a block diagram showing a configuration of a camera misalignment detection system according to an embodiment of the present invention.

FIG. 2 is a diagram illustrating positions at which vehicle-mounted cameras are disposed in a vehicle.

FIG. 3 is a flow chart showing an example of a procedure for the detection of a camera misalignment by a camera misalignment detection device.

FIG. 4 is a diagram illustrating a method for extracting feature points.

FIG. 5 is a diagram illustrating a method for deriving optical flows.

FIG. 6 is a diagram illustrating coordinate conversion processing.

FIG. 7 is a diagram showing an example of a first histogram generated by an estimator.

FIG. 8 is a diagram showing an example of a second histogram generated by an estimator.

FIG. 9 is a diagram showing an example of how a histogram changes when a camera misalignment occurs.

FIG. 10 is a flow chart showing an example of camera misalignment determination processing performed by a determiner.

FIG. 11 is a diagram illustrating a method for narrowing down, based on speed information on a vehicle, optical flows to those to be used in statistical processing.

FIG. 12 is a diagram illustrating a method for narrowing down, based on traveling direction information on a vehicle, optical flows to those to be used in statistical processing.

FIG. 13 is a diagram illustrating a first method aimed at further enhancing the reliability of an estimated value obtained in an estimator.

FIG. 14 is a diagram illustrating a second method aimed at further enhancing the reliability of an estimated value obtained in an estimator.

FIG. 15 is a schematic diagram of an images taken by vehicle-mounted cameras.

FIG. 16 is a flow chart showing a first practical example different from the camera misalignment detection procedure shown in FIG. 3.

FIG. 17 is a flow chart showing a second practical example different from the camera misalignment detection procedure shown in FIG. 3.

FIG. 18 is a schematic diagram illustrating processing for changing a feature point extraction range.

FIG. 19 is a diagram illustrating an example of processing for re-determining a camera misalignment.

FIG. 20 is a flow chart showing a modified example of a camera misalignment detection procedure by a camera misalignment detection device.

FIG. 21 is a block diagram showing a configuration of a camera misalignment detection device in a modified example.

FIG. 22 is a flow chart showing an example of a camera misalignment detection procedure by a camera misalignment detection device in a modified example.

DETAILED DESCRIPTION OF PREFERRED EMBODIMENTS

Hereinafter, illustrative embodiments of the present invention will be described in detail with reference to the accompanying drawings. Although the following description deals with a vehicle as an example of a mobile body, this is not meant as any limitation to vehicles; any mobile bodies are within the scope. The different directions mentioned in the following description are defined as follows: The direction which runs along the vehicle's straight traveling direction and which points from the driver's seat to the steering wheel is referred to as the "front" direction (frontward). The direction which runs along the vehicle's straight traveling direction and which points from the steering wheel to the driver's seat is referred to as the "rear" direction (rearward). The direction which run perpendicularly to both the vehicle's straight traveling direction and the vertical line and which points from the right side to the left side of the driver facing frontward is referred to as the "left" direction (leftward). The direction which run perpendicularly to both the vehicle's straight traveling direction and the vertical line and which points from the left side to the right side of the driver facing frontward is referred to as the "right" direction (rightward).

1. Camera Misalignment Detection System

FIG. 1 is a block diagram showing the configuration of a camera misalignment detection system SYS according to an embodiment of the present invention. The camera misalignment detection system SYS is a system for detecting an abnormality such as a misalignment of a vehicle-mounted camera from its reference installed state such as its installed state at the time of factory shipment of the vehicle. As shown in FIG. 1, the camera misalignment detection system SYS includes a camera misalignment detecting device 1, an image taking section 2, an input section 3, and a sensor section 4.

The camera misalignment detecting device 1 is an abnormality detecting device which detects abnormalities in cameras mounted on a mobile body. Abnormalities in cameras include deviations in the installation position and angle of the cameras. The camera misalignment detecting device 1 is provided on each vehicle furnished with vehicle-mounted cameras. The camera misalignment detecting device 1 processes images taken by vehicle-mounted cameras 21 to 24 included in the image taking section 2 as well as information from the sensor section 4 provided outside the camera misalignment detecting device 1, thereby to detect deviations in the installation position and angle of the vehicle-mounted cameras 21 to 24. The camera misalignment detecting device 1 will be described in detail later.

The camera misalignment detecting device 1 can output the processed information to a display device, a driving assisting device, or the like, of which none is illustrated. The display device displays on a screen warnings and the like, as necessary, based on the information fed from the camera misalignment detecting device 1. The driving assisting device stops a driving assisting function, or corrects taken-image information to perform driving assistance, as necessary, based on the information fed from the camera misalignment detecting device 1. The driving assisting device can be, for example, a device that assists automatic driving, a device that assists automatic parking, or a device that assists emergency braking.

The image taking section 2 is provided on the vehicle for the purpose of monitoring the circumstances around the vehicle. In this embodiment, the image taking section 2 includes four vehicle-mounted cameras 21 to 24. The vehicle-mounted cameras 21 to 24 are each connected to the camera misalignment detecting device 1 on a wired or wireless basis. FIG. 2 is a diagram showing an example of the positions at which the vehicle-mounted cameras 21 to 24 are disposed on the vehicle 7. FIG. 2 is a view of the vehicle 7 as seen from above.

The vehicle-mounted camera 21 is provided at the front end of the vehicle 7. Accordingly, the vehicle-mounted camera 21 is referred to also as the front camera 21. The optical axis 21a of the front camera 21 runs along the front-rear direction of the vehicle 7. The front camera 21 takes an image frontward of the vehicle 7. The vehicle-mounted camera 22 is provided at the rear end of the vehicle 7. Accordingly, the vehicle-mounted camera 22 is referred to also as the rear camera 22. The optical axis 22a of the rear camera 22 runs along the front-rear direction of the vehicle 7. The rear camera 22 takes an image rearward of the vehicle 7. The installation positions of the front and rear cameras 21 and 22 are preferably at the center in the left-right direction of the vehicle, but can instead be positions slightly deviated from the center in the left-right direction.

The vehicle-mounted camera 23 is provided on a left-side door mirror 71 of the vehicle 7. Accordingly, the vehicle-mounted camera 23 is referred to also as a left side camera 23. The optical axis 23a of the left side camera 23 runs along the left-right direction of the vehicle 7. The left side camera 23 takes an image leftward of the vehicle 7. The vehicle-mounted camera 24 is provided on a right-side door mirror 72 of the vehicle 7. Accordingly, the vehicle-mounted camera 24 is referred to also as a right side camera 24. The optical axis 24a of the right side camera 24 runs along the left-right direction of the vehicle 7. The right side camera 24 takes an image rightward of the vehicle 7.

The vehicle-mounted cameras 21 to 24 all have fish-eye lenses with an angle of view of 180° or more in the horizontal direction. Thus, the vehicle-mounted cameras 21 to 24 can together take an image all around the vehicle 7 in the horizontal direction. Although in this embodiment the number of vehicle-mounted cameras is four, the number can be modified as necessary; there can be provided multiple cameras or a single camera. For example, in a case where the vehicle 7 is furnished with a vehicle-mounted camera for the purpose of assisting reverse parking of the vehicle 7, the image taking section 2 can include three vehicle-mounted cameras, namely the rear camera 22, the left side camera 23, and the right side camera 24.

With reference back to FIG. 1, the input section 3 is configured to accept instructions to the camera misalignment detecting device 1. The input section 3 can include, for example, a touch screen, buttons, levers, and the like. The input section 3 is connected to the camera misalignment detecting device 1 on a wired or wireless basis.

The sensor section 4 includes a plurality of sensors that acquire information on the vehicle 7 furnished with the vehicle-mounted cameras 21 to 24. In this embodiment, the sensor section 4 includes a speed sensor 41 and a steering angle sensor 42. The speed sensor 41 senses the speed of the vehicle 7. The steering angle sensor 42 senses the rotation angle of the steering wheel of the vehicle 7. The speed sensor 41 and the steering angle sensor 42 are connected to the camera misalignment detecting device 1 via a communication bus 50. Thus, the information on the speed of the vehicle 7 that is acquired by the speed sensor 41 is fed to the camera misalignment detecting device 1 via the communication bus 50. The information on the rotation angle of the steering wheel of the vehicle 7 that is acquired by the steering angle sensor 42 is fed to the camera misalignment detecting device 1 via the communication bus 50. The communication bus 50 can be, for example, a CAN (controller area network) bus.

2. Camera Misalignment Detecting Device

As shown in FIG. 1, the camera misalignment detecting device 1 includes an image acquirer 11, a controller 12, and a storage 13.

The image acquirer 11 acquires images from the four vehicle-mounted cameras 21 to 24 respectively. The image acquirer 11 has basic image processing functions such as an analog-to-digital conversion function for converting analog taken images into digital taken images. The image acquirer 11 subjects the acquired taken images to predetermined image processing, and feeds the processed taken images to the controller 12.

The controller 12 is, for example, a microcomputer, and controls the entire camera misalignment detecting device 1 in a concentrated fashion. The controller 12 includes a CPU, a RAM, a ROM, and the like. The storage 13 is, for example, a non-volatile memory such as a flash memory, and stores various kinds of information. The storage 13 stores programs as firmware as well as various kinds of data.

More specifically, the controller 12 includes a deriver 121, an estimator 122, and a determiner 123. Thus, the camera misalignment detecting device 1 includes the deriver 121, the estimator 122, and the determiner 123. The functions of these blocks 121 to 123 provided in the controller 12 are carried out, for example, through operational processing by the CPU according to the programs stored in the storage 13.

At least one of the deriver 121, the estimator 122, and the determiner 123 in the controller 12 can be configured in hardware such as an ASIC (application-specific integrated circuit) or an FPGA (field-programmable gate array). The deriver 121, the estimator 122, and the determiner 123 are conceptual constituent elements; the functions carried out by any of them can be distributed among a plurality of constituent elements, or the functions of two or more of them can be integrated into a single constituent element.

An optical flow (motion vector) denotes the movement of a feature point between two images that are fed from the vehicle-mounted cameras 21 to 24 at a predetermined time interval. The deriver 121 derives an optical flow for each feature point. In this embodiment, the vehicle 7 is furnished with four vehicle-mounted cameras 21 to 24. Accordingly, the deriver 121 derives an optical flow for each feature point for each of the vehicle-mounted cameras 21 to 24. A feature point is an outstandingly detectable point in a taken image (a point where the luminance value changes) such as an intersection between edges in a taken image. A feature point is, for example, an edge of a white line drawn on the road surface, a crack in the road surface, a speck on the road surface, or a piece of gravel on the road surface. Usually, there are a number of feature points in one taken image. The deriver 121 derives feature points in taken images by a well-known method such as the Harris operator.

Based on a plurality of optical flows, the estimator 122 estimates the amount of movement of the vehicle 7 furnished with the vehicle-mounted cameras 21 to 24. The estimator 122 subjects a plurality of optical flows to statistical processing to estimate the amount of movement of the vehicle 7 furnished with the vehicle-mounted cameras 21 to 24. In this embodiment, the vehicle 7 is furnished with four vehicle-mounted cameras 21 to 24. Accordingly, the estimator 122 calculates the estimated value of the amount of movement of the vehicle 7 for each of the vehicle-mounted cameras 21 to 24. In this embodiment, the statistical processing performed by the estimator 122 is processing using histograms. The histogram-based processing for estimating the amount of movement will be described in detail later.

Based on the amount of movement estimated by the estimator 122 (that is, estimated information), the determiner 123 determines a misalignment of the vehicle-mounted cameras 21 to 24. Based on the estimated information obtained in the estimator 122 as well as the actually observed information on the movement of the vehicle 7 that is fed from an external sensor other than the vehicle-mounted cameras 21 to 24, the determiner 123 determines a misalignment of, that is, an abnormality in, the vehicle-mounted cameras 21 to 24. In this embodiment, the vehicle 7 is furnished with four vehicle-mounted cameras 21 to 24, and thus the determiner 123 determines a camera misalignment for each of the vehicle-mounted cameras 21 to 24. The external sensor refers to a sensor provided outside the camera misalignment detecting device 1.

In this embodiment, based on the estimated information obtained in the estimator 122 as well as the information on the speed of the vehicle 7 that is fed from the speed sensor 41, the determiner 123 determines a misalignment of the vehicle-mounted cameras 21 to 24. Thus, in this embodiment, the actually observed information includes the information on the speed of the vehicle 7 that is fed to the determiner 123 via the communication bus 50. With this configuration, it is possible to acquire easily and accurately the actual amount of movement of the vehicle 7.

The actually observed information on the movement of the vehicle 7 is not limited to the speed information on the vehicle 7 that is acquired from the speed sensor 41. For example, the actually observed information on the movement of the vehicle 7 can be movement distance information (amount-of-movement information) on the vehicle 7 that is acquired from a GPS (global positioning system) receiver. The actually observed information on the movement of the vehicle 7 can comprise, instead of a single kind of information, a plurality of kinds of information. For example, the actually observed information on the vehicle 7 can comprise two kinds of information: the speed information on the vehicle 7 that is acquired from the speed sensor 41 and the rotation angle information on the steering wheel of the vehicle 7 that is acquired from the steering angle sensor 42.

With the configuration according to this embodiment, the camera misalignment detecting device 1 can detect camera misalignments by using the taken images from the vehicle-mounted cameras 21 to 24 as well as the sensors, such as the speed sensor 41, that are already provided on the vehicle 7. It is thus possible to reduce the cost required in the configuration for the detection of camera misalignments. Moreover, with the configuration according to this embodiment, on the assumption that a large part of what is shown in the taken images is the road surface, it is possible, through statistical processing using the optical flows of feature points, to detect camera misalignments.

FIG. 3 is a flow chart showing an example of the procedure for the detection of a camera misalignment by the camera misalignment detecting device 1. In this embodiment, the camera misalignment detection procedure in FIG. 3 is performed for each of the four vehicle-mounted cameras 21 to 24. Here, to avoid overlapping description, the camera misalignment detection procedure will be described with respect to the front camera 21 as a representative.

As shown in FIG. 3, first, the controller 12 checks whether or not the vehicle 7 furnished with the front camera 21 is traveling straight (step S1). Whether or not the vehicle 7 is traveling straight can be judged, for example, based on the rotation angle information on the steering wheel that is obtained from the steering angle sensor 42. For example, assuming that the vehicle 7 travels completely straight when the rotation angle of the steering wheel equals zero, then, not only when the rotation angle equals zero but also when it falls within a certain range in the positive and negative directions, the vehicle 7 can be judged to be traveling straight. Straight traveling includes both forward and reverse straight traveling.

The controller 12 repeats the check at step S1 until the vehicle 7 is judged to be traveling straight. Unless the vehicle 7 travels straight, no information for determining a camera misalignment is acquired. In other words, the determination of a misalignment in the vehicle-mounted camera (front camera) 21 by the determiner 123 is performed by use of information that is acquired when the vehicle 7 is judged to be traveling straight based on an external sensor (here, the steering angle sensor 42) other than the vehicle-mounted cameras. With this configuration, no determination of a camera misalignment is performed by use of information acquired when the vehicle 7 is traveling along a curved path; this helps avoid complicating the information processing for the determination of a camera misalignment.

If the vehicle 7 is judged to be traveling straight (step S1, Yes), the controller 12 checks whether or not the speed of the vehicle 7 is within a predetermined speed range (step S2). The predetermined speed range is, for example, 3 km per hour or higher but 5 km per hour or lower. In this embodiment, the speed of the vehicle 7 can be acquired from the speed sensor 41, which is an external sensor other than the vehicle-mounted cameras 21 to 24. Steps S1 and S2 can be reversed in order. Steps S1 and S2 can be performed concurrently.

If the speed of the vehicle 7 is outside the predetermined speed range (step S2, No), then, back at step S1, the controller 12 checks whether or not the vehicle 7 is traveling straight. Unless the speed of the vehicle 7 is within the predetermined speed range, no information for determining a camera misalignment is acquired. In other words, the determination of a camera misalignment in the vehicle-mounted camera (front camera) 21 by the determiner 123 is performed by use of information that is acquired when the vehicle 7 is judged to be traveling within the predetermined speed range based on an external sensor (here, the speed sensor 41) other than the vehicle-mounted cameras 21 to 24. For example, if the speed of the vehicle 7 is too high, the derivation of optical flows tends to be incorrect. On the other hand, if the speed of the vehicle 7 is too low, the speed of the vehicle 7 that is acquired from the speed sensor 41 is less reliable. In this respect, with the configuration according to this embodiment, a camera misalignment is determined except when the speed of the vehicle 7 is too high or too low; this helps enhance the reliability of camera misalignment determination.

It is preferable that the predetermined speed range be variably set. With this configuration, the predetermined speed range can be adapted to cover values that suit individual vehicles: this helps improve the reliability of camera misalignment determination. In this embodiment, the predetermined speed range can be set in the input section 3.

If the vehicle 7 is judged to be traveling within the predetermined speed range (step S2, Yes), the deriver 121 extracts a feature point (step S3). In other words, the deriver 121 extracts a feature point when the vehicle 7 is traveling straight at a predetermined low speed. The extraction of a feature point by the deriver 121 is performed, for example, when the vehicle 7 at rest starts to move or when the traveling vehicle 7 is about to stop.

FIG. 4 is a diagram illustrating a method for the extraction of a feature point FP. FIG. 4 schematically shows the taken image P that is taken by the front camera 21. Feature points FP exist on the road surface RS. In FIG. 4, two feature points FP are shown; the number here, however, is merely illustrative and not factual. Usually, a number of feature points FP are acquired. As shown in FIG. 4, the deriver 121 extracts feature points FP within a predetermined region RE. The predetermined region RE is set to be a wide range including the center C of the taken image P. Thus, it is possible to extract feature points FP even in cases where they appear at unevenly distributed spots, in a lopsided range. The predetermined region RE is set to exclude a region where the body BO of the vehicle 7 shows.

When feature points FP are extracted, the deriver 121 derives an optical flow for each of the extracted feature points FP (step S4). FIG. 5 is a diagram illustrating a method for the derivation of an optical flow OF. FIG. 5, like FIG. 4, is a merely illustrative schematic diagram. What FIG. 5 shows is the taken image (current frame P) that is taken by the front camera 21 a predetermined period after the taking of the taken image (previous frame P) shown in FIG. 4. After the taking of the taken image P shown in FIG. 4, by the time that the predetermined period expires, the vehicle 7 has reversed. The broken-line circles in FIG. 5 indicate the positions of the feature points FP at the time of the taking of the taken image P shown in FIG. 4.

As shown in FIG. 5, as the vehicle 7 reverses, the feature points FP, which are located ahead of the vehicle 7, move away from the vehicle 7. That is, the feature points FP appear at different positions in the current frame P' and in the previous frame P. The deriver 121 associates the feature points FP in the current frame P' with the feature points FP in the previous frame P based on pixel values nearby, and derives optical flows based on the respective positions of the feature points FP thus associated together.

When the optical flows OF are derived, the estimator 122 converts the optical flows OF, which have been obtained in the camera coordinate system, into optical flows in the world coordinate system (step S5). FIG. 6 is a diagram illustrating coordinate conversion processing. As shown in FIG. 6, the estimator 122 converts an optical flow OF as seen from the position (view point VP1) of the front camera 21 into an optical flow OF_C as seen from a view point VP2 above the road surface RS on which the vehicle 7 is. The estimator 122 converts each optical flow OF in the taken image P into an optical flow OF_C in the world coordinate system by projecting the former on a virtual plane RS_V that corresponds to the road surface RS.

Next, based on optical flows OF_C in the world coordinate system, the estimator 122 generates a histogram (step S6). In this embodiment, the estimator 122 divides each optical flow OF_C into two, front-rear and left-right, components, and generates a first histogram and a second histogram. FIG. 7 is a diagram showing an example of the first histogram HG1 generated by the estimator 122. FIG. 8 is a diagram showing an example of the second histogram HG2 generated by the estimator 122. FIGS. 7 and 8 show histograms that are obtained when no camera misalignments are present.

The first histogram HG1 shown in FIG. 7 is a histogram obtained based on the front-rear components of optical flows OF_C. The first histogram HG1 is a histogram where the number of optical flows OF_C is taken along the frequency axis and the amount of movement in the front-rear direction (the length of the optical flows OF_C in the front-rear direction) is taken along the class axis. The second histogram HG2 shown in FIG. 8 is a histogram obtained based on the left-right components of optical flows OF_C. The second histogram HG2 is a histogram where the number of optical flows OF_C is taken along the frequency axis and the amount of movement in the left-right direction (the length of the optical flows OF_C in the left-right direction) is taken along the class axis.

FIGS. 7 and 8 show histograms obtained when, while no camera misalignment is present, the vehicle 7 has traveled straight backward. Accordingly, in the first histogram HG1, the frequency tends to be high lopsidedly around a particular movement distance (class) on the rear side. On the other hand, in the second histogram HG2, the frequency tends to be high lopsidedly around a class near zero on the amount-of-movement axis.

FIG. 9 is a diagram showing how a histogram changes when a camera misalignment occurs. FIG. 9 shows a case where the front camera 21 is misaligned as a result of rotating in the tilt direction (vertical direction). In FIG. 9, in the upper tier (a) is the first histogram HG1 obtained with no camera misalignment present (in the normal condition), and in the lower tier (b) is the first histogram HG1 obtained with a camera misalignment present. A rotational deviation of the front camera 21 in the tilt direction has an effect chiefly on the front-rear component of an optical flow OF_C. In the example shown in FIG. 9, the rotational deviation of the front camera 21 in the tilt direction causes the classes where the frequency tends to be high to be displaced frontward as compared with in the normal condition.

A rotational deviation of the front camera 21 in the tilt direction has only a slight effect on the left-right component of an optical flow OF_C. Accordingly, though not illustrated, the change of the second histogram HG2 without and with a camera misalignment is smaller than that of the first histogram HG1. This, however, is the case when the front camera 21 is misaligned in the tilt direction; if the front camera 21 is misaligned, for example, in the pan direction (horizontal direction) or in the roll direction (the direction of rotation about the optical axis), the histograms change differently.

Based on the generated histograms HG1 and HG2, the estimator 122 estimates the amount of movement of the vehicle 7 (step S7). In this embodiment, the estimator 122 estimates the amount of movement of the vehicle 7 in the front-rear direction based on the first histogram HG1; the estimator 122 estimates the amount of movement of the vehicle 7 in the left-right direction based on the second histogram HG2. That is, the estimated information obtained in the estimator 122 includes estimated values of the amounts of movement of the vehicle 7 in the front-rear and left-right directions. With this configuration, it is possible to detect a camera misalignment by use of estimated values of the amounts of movement of the vehicle 7 in the front-rear and left-right directions, and it is thus possible to enhance the reliability of the result of camera misalignment detection. In this embodiment, the amounts of movement of the vehicle 7 are estimated on the assumption that feature points that are extracted under particular conditions exist on the road surface RS.

In this embodiment, the estimator 122 takes the median value of the first histogram HG1 as the estimated value of the amount of movement in the front-rear direction; the estimator 122 takes the median value of the second histogram HG2 as the estimated value of the amount of movement in the left-rear directions. This, however, is not meant to limit the method by which the estimator 122 determines the estimated values. For example, the estimator 122 can take the classes in which the histograms HG1 and HG2, respectively, exhibit the maximum frequencies as the estimated values of the amounts of movement. For another example, the estimator 122 can take the mean values (average values) in the histograms HG1 and HG2, respectively, as the estimated values of the amounts of movement.

In the example shown in FIG. 9, a dash-dot line indicates the estimated value of the amount of movement in the front-rear direction that is obtained when the front camera 21 is in the normal condition, and a dash-dot-dot line indicates the estimated value of the amount of movement in the front-rear direction that is obtained when a camera misalignment is present. As shown in FIG. 9, a camera misalignment produces a difference Δ in the estimated value of the amount of movement in the front-rear direction.

When estimated values of the amounts of movement of the vehicle 7 are obtained in the estimator 122, the determiner 123 determines a misalignment of the front camera 21 (step S8). If, for at least one of the amount of movement of the vehicle 7 in the front-rear direction, the amount of movement of the vehicle 7 in the left-right direction, and a particular amount obtained based on the amounts of movement of the vehicle 7 in the front-rear and left-right directions, the difference between the estimated value obtained in the estimator 122 and the value obtained based on the actually observed information related to the movement of the vehicle 7 that is fed from an external sensor other than the vehicle-mounted cameras 21 to 24 is equal to or larger than a predetermined threshold value, the determiner 123 determines that the vehicle-mounted camera (front camera) 21 is misaligned. With this configuration, it is possible to detect a misalignment of a vehicle-mounted camera properly by comparing the estimated values of the amounts of movement of the vehicle 7 as obtained from the vehicle-mounted cameras with the amounts of movement of the vehicle 7 as obtained from the actually observed information from the external sensor.

In this embodiment, the actually observed information related to the movement of the vehicle 7 that is fed from an external sensor other than the vehicle-mounted cameras 21 to 24 is the speed information on the vehicle 7 that is fed from the speed sensor 41. From this speed information, the amounts of movement of the vehicle 7 with which to compare the estimated values are calculated. Specifically, those amounts of movement are calculated based on the image taking time interval between the two taken images for the derivation of optical flows OF and the speed of the vehicle 7 during that interval that is obtained from the speed sensor 41. Moreover, those amounts of movement comprise two values, one in the front-rear direction and the other in the left-right direction, corresponding to the estimator 122 generating two estimated values of the amounts of movement in the front-rear and left-right directions. However, in this embodiment, where the taken images for the derivation of optical flows OF are taken when the vehicle 7 is traveling in the front-rear direction, the vehicle 7 does not move in the left-right direction meanwhile; thus, the amount of movement in the left-right direction that is calculated from the speed information always equals zero.

FIG. 10 is a flow chart showing an example of the camera misalignment determination processing performed by the determiner 123. First, for the amount of movement in the front-rear direction, the determiner 123 checks whether or not the difference between the estimated value estimated in the estimator 122 and the value calculated based on the speed information on the vehicle 7 that is obtained from the speed sensor 41 is smaller than a first threshold value (step S11). If the difference between the two values is equal to or larger than the first threshold value (Step S11, No), the determiner 123 determines that the front camera 21 is installed in an abnormal state and is misaligned (step S15). On the other hand, if the difference between the two values is larger than the first threshold value (Step S11, Yes), the determiner 123 determines that no abnormality is detected from the amount of movement in the front-rear direction.

When no abnormality is detected from the amount of movement in the front-rear direction, then, for the amount of movement in the left-right direction, the determiner 123 checks whether or not the difference between the estimated value estimated in the estimator 122 and the value calculated based on the speed information on the vehicle 7 that is obtained from the speed sensor 41 is smaller than a second threshold value (step S12). If the difference between the two values is equal to or larger than the second threshold value (step S12, No), the determiner 123 determines that the front camera 21 is installed in an abnormal state and is misaligned (step S15). On the other hand, if the difference between the two values is smaller than the second threshold value (step S12, Yes), the determiner 123 determines that no abnormality is detected from the amount of movement in the left-right direction.

When no abnormality is detected from the amount of movement in the left-right direction either, then, for the particular amount obtained based on the amounts of movement in the front-rear and left-right directions, the determiner 123 checks whether or not the difference between the estimated value estimated in the estimator 122 and the value found based on the speed information on the vehicle 7 that is obtained from the 41 is smaller than a third threshold value (step S13). In this embodiment, the particular amount is the value of the square root of the sum of the value obtained by squaring the amount of movement in the front-rear direction and the value obtained by squaring the amount of movement in the left-right direction. This, however, is merely an example; the particular amount can instead be, for example, the sum of the value obtained by squaring the amount of movement in the front-rear direction and the value obtained by squaring the amount of movement in the left-right direction.

If the difference between the estimated value of the particular amount and the value calculated based on the speed information is equal to or larger than the third threshold value (step S13, No), the determiner 123 determines that the front camera 21 is installed in an abnormal state and is misaligned (step S15). On the other hand, if the difference between the two values is smaller than the third threshold value (step S13, Yes), the determiner 123 determines that the front camera 21 is installed in a normal state (step S14).

In this embodiment, if an abnormality is recognized in any one of the amount of movement in the front-rear direction, the amount of movement in the left-right direction, and the particular amount through comparison of the estimated values obtained in the estimator 122 with the values obtained based on the speed information, it is judged that a camera misalignment is present. With this configuration, it is possible to make it less likely to judge that no camera misalignment is present despite one being present. This, however, is merely an example; a configuration is also possible where, only if an abnormality is recognized in all of the amount of movement in the front-rear direction, the amount of movement in the left-right direction, and the particular amount through comparison of the estimated values obtained in the estimator 122 with the values obtained based on the speed information, it is judged that a camera misalignment is present. It is preferable that the criteria for the determination of a camera misalignment be changeable as necessary in the input section 3.

In this embodiment, for the amount of movement in the front-rear direction, the amount of movement in the left-right direction, and the particular amount, comparison of the estimated values with the values obtained based on the speed information is performed by turns; instead, their comparison may be performed concurrently. In a configuration where, for the amount of movement in the front-rear direction, the amount of movement in the left-right direction, and the particular amount, comparison of the estimated values with the values obtained based on the speed information is performed by turns, there is no particular restriction on the order, the order may be different from that shown in FIG. 10. In this embodiment, a camera misalignment is determined based on amounts of movement; instead, a camera misalignment may be determined based on speeds. In that case, a camera misalignment can be determined by estimating the speeds in the front-rear and left-right directions based on the amounts of movement estimated from optical flows and the time interval between the frames used to calculate the optical flows and then comparing them with the speed of the vehicle 7 that is obtained from the speed sensor 41. The speed of the vehicle 7 obtained from the speed sensor 41 in that case is the speed in the front-rear direction, and the speed in the left-right direction equals zero. Thus, in this embodiment, "amount of movement" is synonymous with "speed".

It is preferable that, when a camera misalignment is detected, the camera misalignment detecting device 1 perform processing to alert the driver or the like to it. It is preferable that the camera misalignment detecting device 1 perform processing to notify the occurrence of a camera misalignment to a driving assisting device that assists driving by using information from the vehicle-mounted cameras 21 to 24. In this embodiment, where four vehicle-mounted cameras 21 to 24 are provided, it is preferable that such alerting and notifying processing be performed when a camera misalignment has occurred in any one of the four vehicle-mounted cameras 21 to 24.

3. Details of Statistical Processing

Based on movement information (actually observed information) on the vehicle 7 that is obtained from an external sensor other than the vehicle-mounted cameras 21 to 24, the estimator 122 narrows down the plurality of optical flows OF derived in the deriver 121 to optical flows OF to be used in statistical processing, and estimates the amounts of movement of the vehicle 7.

The optical flows OF derived in the deriver 121 are liable to be affected by the road surface condition and other conditions, and the plurality of optical flows OF derived may include some that do not accurately reflect the movement of the vehicle 7. In this embodiment, by use of movement information on the vehicle 7 that is obtained from a sensor provided externally to the camera misalignment detecting device 1, it is possible to calculate estimated values of the amounts of movement of the vehicle 7 after excluding such optical flows OF as are unlikely to accurately reflect the movement of the vehicle 7. It is thus possible to enhance the reliability of the camera misalignment determination processing in the determiner 123.

The method of this embodiment is more suitable for the detection of comparatively small misalignments of the vehicle-mounted cameras 21 to 24 than for the detection of large misalignments of the vehicle-mounted cameras 21 to 24. In this embodiment, the statistical processing includes processing for generating histograms showing the distribution of amounts of movement based on a plurality of optical flows OF.

The movement information on the vehicle 7 that is obtained from the external sensor includes speed information on the vehicle 7. The speed information on the vehicle 7 can be acquired, for example, from the speed sensor 41 via the communication bus 50. The speed information on the vehicle 7 can instead be acquired from, for example, any other sensor such as a GPS sensor. The estimator 122 narrows down the optical flows OF to be used in the statistical processing to optical flows OF that indicate amounts of movement within a certain range that is set based on the speed information, and estimates the amounts of movement. With this configuration, it is possible to calculate estimated values of the amounts of movement of the vehicle 7 after excluding optical flows OF that are far deviated from the amounts of movement estimated from the speed information on the vehicle 7, and it is thus possible to enhance the reliability of the camera misalignment determination processing.

FIG. 11 is a diagram illustrating a method for narrowing down optical flows OF to those to be used in statistical processing based on the speed information on the vehicle 7. FIG. 11 shows, as an example, an amount-of-movement histogram in the front-rear direction (the first histogram HG1). Specifically, using coordinate-converted optical flows OF_C, the estimator 122 narrows down the optical flows to be used in statistical processing. From among a plurality of coordinate-converted optical flows OF_C, the estimator 122 extracts optical flows OF_C of which the magnitude (amount of movement in the front-rear direction) falls within a certain range. In FIG. 11, the hatched part corresponds to the certain range. Using the histograms generated by use of the extracted optical flows OF_C, the amounts of movement of the vehicle 7 are estimated.

In this embodiment, amount-of-movement histograms in the front-rear and left-right directions are generated; when these are generated, only those optical flows OF_C which are extracted through the extraction processing described above are used. In this embodiment, when optical flows OF are narrowed down, only front-rear components are used. This, however, is not meant as any limitation: it is also possible to use only left-right components, or to use both front-rear and left-right components.

The certain range that is set based on the speed information is a range extending over a predetermined width in the front-rear direction around the actual amount of movement of the vehicle 7 as calculated from the speed information on the vehicle 7. The actual amount of movement of the vehicle 7 is the amount of movement of the vehicle 7 during the taking time interval between the two images for the derivation of optical flows OF. In this embodiment, the actual amount of movement of the vehicle 7 is the amount of movement in the front-rear direction. The predetermined width is determined, for example, through experiments, simulations, or the like so as to permit camera misalignment detection.

The estimator 122 can, if the speed of the vehicle 7 falls outside a predetermined speed range, change the criteria for setting the certain range from those used when it falls within the predetermined speed range. In this embodiment, optical flows OF are acquired only when the speed of the vehicle 7 is 3 km per hour or higher but 5 km per hour or lower, and the criteria for setting the certain range is constant. Instead, optical flows OF may be acquired when the speed of the vehicle 7 is, for example, as extremely low as about 1 km per hour or 5 km per hour or higher. However, with the speed of the vehicle 7 extremely low, the accuracy of the speed obtained from the speed sensor 41 is low. On the other hand, when the speed of the vehicle 7 is comparatively high, the accuracy of optical flows OF is low. It is therefore preferable that the criteria for setting the certain range be changed between when the speed of the vehicle 7 is in a predetermined speed range such as, for example, 3 km per hour or higher but 5 km or lower and when it falls outside the predetermined speed range. For example, it is preferable that the certain range be set with a larger width around the actual movement distance of the vehicle 7 when the speed of the vehicle 7 falls outside the range of 3 km per hour or higher but 5 km per hour or lower than when it falls within the range of 3 km per hour or higher but 5 km per hour or lower.

The movement information (actually observed information) on the vehicle 7 that is obtained from the external sensor includes traveling direction information on the vehicle 7. The traveling direction information on the vehicle 7 can be acquired, for example, from the steering angle sensor 42 via the communication bus 50. Instead, the traveling direction information on the vehicle 7 can be acquired from any other sensor such as a GPS sensor. If, based on the traveling direction information, it is judged that the vehicle 7 was traveling straight in the front-rear direction when the images for the derivation of optical flows OF were acquired, the estimator 122 estimates the amounts of movement after excluding optical flows OF of which the amount of movement in the left-right direction falls outside the predetermined range. With this configuration, it is possible to calculate estimated values of the amounts of movement of the vehicle 7 after excluding those optical flows OF which do not have components in the traveling direction of the vehicle 7 and which are thus less reliable, and thus to enhance the reliability of the camera misalignment determination processing.

FIG. 12 is a diagram illustrating a method for narrowing down the optical flows OF to be used in statistical processing based on the traveling direction information on the vehicle 7. FIG. 12 shows, as an example, an amount-of-movement histogram in the left-right direction (the second histogram HG2). In this embodiment, optical flows OF are acquired only when the vehicle 7 is traveling straight in the front-rear direction. Accordingly, the estimator 122 checks, for all of the plurality of optical flows OF derived in the deriver 121, whether or not the magnitude (amount of movement) of the left-right component of coordinate-converted optical flows OF_C falls outside a predetermined range. In FIG. 12, the hatched parts correspond to outside the predetermined range. Using histograms generated excluding optical flows OF_C of which the amount of movement of the left-right component falls outside the predetermined range, the estimator 122 estimates the amounts of movement of the vehicle 7. The predetermined range is determined appropriately, for example, through experiments, simulations, or the like.

In this embodiment, amount-of-movement histograms in the front-rear and left-right directions are generated; when these are generated, those optical flows OF_C which are excluded through the processing described above are not used. The processing for narrowing down optical flows OF by use of the movement information on the vehicle 7 can involve only one of the previously described narrowing-down using the speed information and the just-described narrowing-down using the traveling direction information.

FIG. 13 is a diagram illustrating a first method for further enhancing the reliability of the estimated values obtained in the estimator 122. FIG. 13 shows, as an example, an amount-of-movement histogram in the front-rear direction (the first histogram HG1). As shown in FIG. 13, the estimator 122 can perform estimation processing after excluding amount-of-movement classes where the frequency in the histogram is lower than a certain number. Specifically, the estimator 122 can estimate the amounts of movement by using a histogram from which amount-of-movement classes where the frequency in the histogram is lower than a certain number have been excluded. In FIG. 13, the broken line indicates the certain number. The certain number is determined, for example, through experiments, simulations, or the like. Amount-of-movement classes where the frequency is extremely low are likely to give less reliable data. Thus, with this configuration, it is possible to improve the reliability of the estimated values obtained in the estimator 122. The processing for excluding amount-of-movement classes where the frequency in the histogram is lower than the certain number can be applied not only to the processing using the first histogram HG1 but also to the processing using the second histogram HG2.

FIG. 14 is a diagram illustrating a second method for further enhancing the reliability of the estimated values obtained in the estimator 122. FIG. 14 shows, as an example, an amount-of-movement histogram in the front-rear direction (the first histogram HG1). The estimator 122 can perform estimation processing for a range of amount-of-movement classes in the histogram that is set, in accordance with the degree of dispersion of the histogram, to be used in the estimation of the amounts of movement of the vehicle 7. Specifically, the estimator 122 can estimate the amounts of movement by using a histogram in a range of amount-of-movement classes that is set in accordance with the degree of dispersion of the histogram. This processing can be applied not only to the processing using the first histogram HG1 but also to the processing using the second histogram HG2.

FIG. 15 is a schematic diagram of an image P taken by the vehicle-mounted cameras 21 to 24. As shown in FIG. 15, the image P taken by the vehicle-mounted cameras 21 to 24 may show the shadow SH of the vehicle 7 itself. If, as shown in FIG. 15, the shadow SH appears within the predetermined region RE for the extraction of feature points FP, the deriver 121 may extract feature points FP that stem from the shadow SH. Since feature points FP stemming from the shadow SH move together with the vehicle 7, any optical flow OF based on those feature points FP has a zero magnitude and does not reflect the movement of the vehicle 7. FIG. 14 shows, as an example, a histogram obtained when the shadow SH of the vehicle 7 appears in part of the predetermined region RE. Although the vehicle 7 has moved, a peak appears also near zero on the amount-of-movement axis, and the histogram is dispersed.

In the example shown in FIG. 14, the estimator 122 can, based on the speed information obtained from the speed sensor 41, set the range of amount-of-movement classes in the histogram to be used for the estimation of the amounts of movement of the vehicle 7. Specifically, if, from the speed information, the vehicle 7 is judged to be moving, a peak that appears near zero on the amount-of-movement axis is likely to be inappropriate data. Thus, as indicated by hatching in FIG. 14, the estimator 122 sets a range in which to estimate the amounts of movement around a peak located away from zero on the amount-of-movement axis, and estimates the amounts of movement by using the data within the so set range. With this configuration, even when the histogram is greatly dispersed under the influence of the shadow SH of the vehicle 7 or the like, it is possible to obtain highly reliable estimated values. In a case where the histogram is greatly dispersed, the estimator 122 can estimate the amounts of movement, instead of by using the speed information, simply by excluding parts a certain amount away from a peak from the range used for the estimation of the amounts of movement. The certain amount can be determined, for example, through experiments, simulations, or the like, and can be stored in the storage 13 beforehand.

Otherwise, the estimator 122 can perform estimation processing by setting a range of amount-of-movement classes in the histogram to be used for the estimation of the amounts of movement of the vehicle 7 based on the previously performed estimation processing for the amounts of movement of the vehicle 7. Specifically, the estimator 122 can estimate the amounts of movement by using a histogram within a range of amount-of-movement classes that is set based on the previously performed estimation processing. Such processing can be applied not only to the processing using the first histogram HG1 but also to the processing using the second histogram HG2. With this configuration, the conditions and results of the estimation processing for the vehicle 7 that was previously performed in the estimator 122 are stored in the storage 13. The data stored in the storage 13 can be immediately previous estimation processing data, but can also include at least one-generation further previous estimation processing data. It is preferable to store in the storage 13 not only information on the past estimation processing by the estimator 122 but also information on the past determination processing by the determiner 123.

With this configuration, the estimator 122 can obtain estimated values of the amounts of movement under highly reliable conditions by reading, for example, results of the vehicle-mounted cameras 21 to 24 having been determined to be installed in a normal state continuously up to then. Moreover, with this configuration, in a case where an abnormality has been detected previously, it is possible to perform histogram processing under conditions different from those for the previous estimation processing.

4. Processing for Handling an Abnormal-Estimation State

As shown in FIG. 15, the image P taken by the vehicle-mounted cameras 21 to 24 may show the shadow SH of the vehicle 7. For example, in a case where the sunlight points from rear to front along the traveling direction of the vehicle 7, the front camera 21 may capture the shadow SH of the vehicle 7. As shown in FIG. 15, if the shadow SH appears within the predetermined region RE for the extraction of feature points FP, the deriver 121 may extract feature points FP stemming from the shadow SH. Since feature points FP stemming from the shadow SH move together with the vehicle 7, any optical flow OF based on those feature points FP has a zero magnitude and does not reflect the movement of the vehicle 7.

That is, with the above-described method for detecting camera misalignments by use of optical flows OF, it can happen that, even though the vehicle 7 is recognized to be moving based on an external sensor (for example, the speed sensor 41), the vehicle 7 is estimated to be at rest based on the estimated information acquired in the estimator 122, a state called as an abnormal-estimation state. The abnormal-estimation state occurs also when no camera misalignment is present, and thus can cause erroneous detection of a camera misalignment. It is therefore preferable that, when the abnormal-estimation state occurs, the determiner 123 halts misalignment determination processing for the vehicle-mounted cameras 21 to 24. With this configuration, it is possible to suppress erroneously determining a camera misalignment to be present despite actually no camera misalignment being present.

FIG. 16 is a flow chart showing a first practical example, which is different from the camera misalignment detection procedure shown in FIG. 3. The camera misalignment detection procedure shown in FIG. 16 is performed for each of the four vehicle-mounted cameras 21 to 24. In the example shown in FIG. 16, at step S1 through step S7, the same processing as in the example shown in FIG. 3 is performed. For the same processing as that described previously, no description will be repeated. In the example shown in FIG. 16, after the amount-of-movement estimation processing at step S7, processing for checking for the abnormal-estimation state is performed (step S21). The processing for checking for the abnormal-estimation state is performed, for example, by the determiner 123, but this is not meant as any limitation; it may be performed instead, for example, by the estimator 122.

For example, based on the speed information obtained from the speed sensor 41, the determiner 123 checks whether or not the vehicle 7 has moved in the front-rear direction during the taking time interval between the two taken images for the derivation of optical flows OF. In this embodiment, however, the taken images for the derivation of optical flows OF are taken when the vehicle 7 is detected moving in the front-rear direction based on the information obtained from the sensor section 4, and thus the determiner 123 does not actually make the just-mentioned check of whether or not the vehicle 7 has moved in the front-rear direction. That is, the determiner 123 simply checks, based on the estimated value of the amount of movement in the front-rear direction that is obtained in the estimator 122, whether or not the vehicle 7 is estimated to be at rest. If the vehicle 7 is estimated to be at rest, the determiner 123 detects the abnormal-estimation state. On the other hand, if the vehicle 7 is estimated not to be at rest, the determiner 123 detects no abnormal-estimation state. Not only when the estimated value of the amount of movement in the front-rear direction is zero but also when it is close to zero, the vehicle 7 can be estimated to be at rest.

If no abnormal-estimation state is detected (step S21, No), the determiner 123 performs the above-described misalignment determination processing at step S8. On the other hand, if the abnormal-estimation state is detected (step S21, Yes), the determiner 123 halts the misalignment determination processing (step S22); that is, the determiner 123 does not perform the misalignment determination processing. In this embodiment, a plurality of vehicle-mounted cameras 21 to 24 are provided. If the abnormal-estimation state is occurring in part of the plurality of vehicle-mounted cameras 21 to 24, the misalignment determination processing is performed for the rest of the vehicle-mounted cameras in which no abnormal-estimation state is occurring. It is thus possible to efficiently detect camera misalignments in a plurality of vehicle-mounted cameras 21 to 24.

After the camera misalignment determination processing is halted, it is checked whether or not to continue the halt of the misalignment determination processing (step S23). This check is performed, for example, by the determiner 123. Specifically, based on information obtained from the steering angle sensor 42, the determiner 123 monitors the traveling direction of the vehicle 7. If the traveling direction of the vehicle 7 is constant, the determiner 123 determines to continue the halt of the misalignment determination processing (step S23, Yes). Until the traveling direction of the vehicle 7 changes, the determiner 123 repeats the check at step S23. When the traveling direction of the vehicle 7 changes, the determiner 123 determines not to continue the halt of the misalignment determination processing (step S23, No). In other words, the determiner 123 continues the halt of the misalignment determination processing until the traveling direction of the vehicle 7 changes. The determiner 123 judges that the vehicle 7 has changed its traveling direction on judging, based on information obtained from the steering angle sensor 42, that the traveling direction of the vehicle 7 has changed through a predetermined or larger angle.

In a case where the abnormal-estimation state is occurring due to the shadow SH of the vehicle 7, if the traveling direction of the vehicle 7 is constant, even when re-determination is performed, it is likely that the abnormal-estimation state stemming from the shadow SH of the vehicle 7 is detected again. By continuing the halt of the misalignment determination processing until the traveling direction of the vehicle 7 changes, it is possible to suppress repeated detection of the abnormal-estimation state.

The example described above deals with a configuration where, when the abnormal-estimation state is detected once, the misalignment determination processing is halted. Instead, a configuration is also possible where, when the abnormal-estimation state is detected a plurality of times successively, the misalignment determination processing is halted. That is, when the abnormal-estimation state is detected at least once, the determiner 123 can continue the halt of the misalignment determination processing until the traveling direction of the vehicle 7 changes.

The traveling direction of the vehicle 7 can be monitored by use of, instead of information from the steering angle sensor 42, information from a GPS sensor. The traveling direction of the vehicle 7 can be monitored by use of, in addition to information from the steering angle sensor 42, also information from a GPS sensor.

The abnormal-estimation state can include a case where, despite the vehicle 7 being recognized to be moving based on an external sensor (for example, the speed sensor 41), the plurality of optical flows OF derived in the deriver 121 include a predetermined or higher proportion of optical flows OF that are judged to involve no motion. The predetermined proportion can be determined appropriately through experiments, simulations, or the like. If the plurality of optical flows OF derived in the deriver 121 include a large number of optical flows OF that are judged to involve no motion, the estimated values of the amounts of movement from the estimator 122 are less reliable, making erroneous detection of a camera misalignment likely. With this configuration, it is possible to halt camera misalignment determination with a widened range where the estimated values of the amounts of movement of the vehicle 7 are less reliable, and thus to make erroneous detection of a camera misalignment less likely.

When the determiner 123 determines not to continue the halt of the misalignment determination processing (step S23, No), then, back at step S1, taken images are acquired with predetermined timing and the processing for deriving optical flows OF by the deriver 121 is restarted. That is, when the traveling direction of the vehicle 7 changes during the halt of the misalignment determination processing, then, based on a plurality of optical flows OF newly acquired after the change of the traveling direction, the amount-of-movement estimation by the estimator 122 and the misalignment determination processing by the determiner 123 are performed. With this configuration, optical flows OF can more likely be derived by use of taken images that show no shadow SH of the vehicle 7, and it is thus possible to make erroneous determination of a camera misalignment less likely. In the example shown in FIG. 16, if the abnormal-estimation state is detected again based on the plurality of newly acquired optical flows OF, the misalignment determination processing is halted.

FIG. 17 is a flow chart showing a second practical example, which is different from the camera misalignment detection procedure shown in FIG. 3. The camera misalignment detection procedure shown in FIG. 17 is performed for each of the four vehicle-mounted cameras 21 to 24. In the example shown in FIG. 17, as in the example shown in FIG. 16, at step S1 through step S7, the same processing as in the example shown in FIG. 3 is performed. In the example shown in FIG. 17, as in the example shown in FIG. 16, after the amount-of-movement estimation processing at step S7, processing for checking for the abnormal-estimation state is performed (step S21). The processing for checking for the abnormal-estimation state is the same as that described previously, and therefore no overlapping description will be repeated. Also, the processing (step S8) performed if no abnormal-estimation state is detected (step S21, No) is the same as that described previously, and therefore no overlapping description will be repeated.

In the example shown in FIG. 17, unlike in the example shown in FIG. 16, when the abnormal-estimation state is detected (step S21, Yes), instead of the misalignment determination processing by the determiner 123 being halted immediately, it is checked whether or not to halt the misalignment determination processing (step S24). The processing for this check is performed, for example, by the determiner 123.

Specifically, the determiner 123 checks whether or not the position of the shadow SH of the vehicle 7 can be recognized. If the position of the shadow SH of the vehicle 7 cannot be recognized, the determiner 123 determines to halt the misalignment determination processing (step S24, Yes). On the other hand, if the position of the shadow SH of the vehicle 7 can be recognized, the determiner 123 determines not to halt the misalignment determination processing (step S24, No). The position of the shadow SH of the vehicle 7 is determined, for example, based on the contrast of the images taken for the acquisition of optical flows OF. Instead, the position of the shadow SH of the vehicle 7 may be determined, for example, based on one or more kinds of information including the time of the images taken for the acquisition of optical flows OF, the weather forecast at that time, and vehicle information (for example, the traveling direction) acquired via the communication bus 50.

When it is determined that the misalignment determination processing be halted (step S24, Yes), step S23 described above is performed. This processing is the same as that described above, and therefore no description will be repeated. On the other hand, when it is determined that the misalignment determination processing not be halted (step S24, No), processing for changing the feature point extraction region is performed (step S25).

FIG. 18 is a schematic diagram illustrating the processing for changing the feature point extraction region RE. As described above, when it is determined that the misalignment determination processing not be halted, the position of the shadow SH of the vehicle 7 has been recognized. Accordingly, in deriving optical flows OF, it is possible to identify the position where the shadow SH of the vehicle 7 exerts no effect. Thus, as shown in FIG. 18, the feature point extraction region RE' is set at a position deviated from (not overlapping with) the shadow SH of the vehicle 7.

When the feature point extraction region RE' is set, then, back at step S3, optical flows OF are derived in the newly set extraction region, and based on these optical flows OF, the amount-of-movement estimation by the estimator 122 and the misalignment determination processing by the determiner 123 are preformed. Here, the taken images for the derivation of optical flows OF are the same as those previously used for the detection of the abnormal-estimation state.

As described above, in the example shown in FIG. 17, if the position of the shadow SH of the vehicle 7 can be recognized when the abnormal-estimation state occurs, the misalignment determination processing by the determiner 123 is not halted; instead, based on a plurality of optical flows OF derived by use of feature points FP located in a range deviated from the shadow SH, the amount-of-movement estimation by the estimator 122 and the misalignment determination processing by the determiner 123 are preformed. With this configuration, it is possible to determine a camera misalignment properly without halting the misalignment determination processing. That is, it is possible to detect a camera misalignment promptly.

5. Modified Examples 5-1. First Modified Example

The above description deals with a configuration where, when the determiner 123 only once determines that a camera misalignment has occurred, the determination that a camera misalignment has occurred is taken as definitive, and thereby a camera misalignment is detected. This, however, is not meant as any limitation. Instead, when the determiner 123 determines that a camera misalignment has occurred, re-determination is performed at least once again so that, if it is once again determined that a camera misalignment has occurred, the determination that a camera misalignment has occurred is taken as definitive. The re-determination can be achieved with a configuration where steps S1 to S8 shown in FIG. 3 are simply repeated at least once again, or can be achieved with any other configuration. Re-determination can be applied to a procedure additionally involving the processing shown in FIGS. 16 and 17 for detecting the abnormal-estimation state.

FIG. 19 is a diagram illustrating an example of processing for re-determining a camera misalignment. In FIG. 19, feature points are omitted from illustration. As shown in FIG. 19, on determining that a misalignment is present in a vehicle-mounted camera based on estimated information estimated by use of the optical flows of feature points within a first region RE including the center C of the image, the determiner 123 can re-determine the misalignment of the vehicle-mounted camera based on estimated information obtained by use of the optical flows of feature points within a second region RE2 that does not include the center C of the image. The image used in the re-determination can be the same as that used in the previous camera misalignment determination, or can be an image newly taken after the taking of the image used in the previous camera misalignment determination.

One or more than one second region RE2 can be defined. In the example shown in FIG. 19, two second regions RE2 are defined; instead, three or more second regions RE2 may be defined. In a case where a plurality of second regions RE2 are defined, the derivation of optical flows OF by the deriver 121, the acquisition of estimated information on the amounts of movement by the estimator 122, and the determination of a camera misalignment by the determiner 123 are performed for each of the second regions RE2. It is preferable that a second region RE2 be smaller than the first region RE1.

When a camera misalignment occurs in the vehicle-mounted cameras 21 to 24, the difference between the amount of movement of the vehicle 7 that is obtained by the estimator 122 and the amount of movement of the vehicle 7 that is obtained based on the actually observed information obtained from a sensor such as the speed sensor 41 tends to be larger in a region away from the center C of the image than at the center C. Accordingly, by performing re-determination by using the second region RE2 located away from the center C, it is possible to improve the accuracy of camera misalignment detection.

5-2. Second Modified Example

FIG. 20 is a flow chart showing a modified example of the procedure for camera misalignment detection by the camera misalignment detecting device 1. The processing at steps S1 through S7 is the same as the above-described processing shown in FIG. 3, and therefore no description will be repeated. In this modified example, after the estimated values of the amounts of movement are calculated at step S7, processing for adding the calculated estimated values to the cumulative values of previously calculated amounts of movement is performed (step S9). This processing can be performed, for example, by the estimator 122 or the determiner 123. The cumulative value calculation processing is performed for each of the estimated value of the amount of movement in the front-rear direction and the estimated value of the amount of movement in the left-right direction. When estimated values are calculated for the first time, there is no previously calculated cumulative values; thus, the cumulative values obtained through the cumulative value calculation processing are the very estimated values acquired at step S7.

When the cumulative values are calculated, it is checked whether or not the amount of movement of the vehicle 7 has reached a predetermined movement distance (step S10). In this modified example, what is meant here by the amount of movement of the vehicle 7 is the cumulated value of the amount of movement of the vehicle 7 in the front-rear direction during the taking time interval between the two images for the derivation of optical flows OF. The amount of movement of the vehicle 7 in the front-rear direction is calculated from the speed information obtained from the speed sensor 41. The start of accumulation of the amount of movement coincides with the start of accumulation of the estimated values. If the amount of movement of the vehicle 7 in the front-rear direction has not reached the predetermined movement distance (step S10, No), then a return is made to step S1, so that steps S1 through S7 and S9 are performed sequentially.

On the other hand, if the amount of movement of the vehicle 7 in the front-rear direction has reached the predetermined movement distance (step S10, Yes), the determiner 123 determines a camera misalignment (step S8A). The determiner 123 uses the cumulative values as the estimated values of the amounts of movement. In this embodiment, two cumulative values are available: the cumulative value in the front-rear direction and the cumulative value in the left-right direction. The values taken as the target of comparison is the cumulative values of the amounts of movement of the vehicle 7 during the taking time interval between the two images for the derivation of optical flows OF, and are calculated from the speed information obtained from the speed sensor 41. In this embodiment, these values include the amount of movement in the front-rear direction and the amount of movement in the left-right direction. However, in this modified example, which is so configured that the taken images for the derivation of optical flows OF are taken when the vehicle 7 is traveling straight in the front-rear direction, the vehicle 7 does not move in the left-right direction meanwhile, and the amount of movement in the left-right direction (the value to be compared with the cumulative value in the left-right direction) equals zero.

In this modified example, until the amount of movement of the vehicle 7 reaches the predetermined distance, the processing for calculating cumulative values by adding up the estimated values obtained in the estimator 122 is performed; when the amount of movement of the vehicle 7 reaches the predetermined distance, the determiner 123 determines a camera misalignment based on the cumulative values. With this configuration, when a camera misalignment is present, it is possible to determine it at the time when the difference between the estimated values and the values obtained from the actually observed information appear clearly, and thus to enhance the reliability of misalignment determination. The configuration of this modified example can be applied to a procedure additionally involving the processing shown in FIGS. 16 and 17 for detecting the abnormal-estimation state.

5-3. Third Modified Example

In what has been described thus far, the determiner 123 determines a camera misalignment based on the amounts of movement estimated from optical flows and the actually observed information obtained from a sensor such as the speed sensor 41. In the third modified example, the determiner 123 determines a camera misalignment, that is, an abnormality, through comparison among the amounts of movement estimated from optical flows in the vehicle-mounted cameras 21 to 24 respectively. In the third modified example, the estimator 122 estimates, based on images taken by the vehicle-mounted cameras 21 to 24 respectively, the amounts of movement of the mobile body for each of the plurality of cameras. The determiner 123 compares information on the amounts of movement for each of the cameras that is obtained in the estimator 122, and determines a camera in which the abnormality is occurring. For example, if the differences between the amounts of movement estimated in the respective cameras all fall within a predetermined range including an error range, the determiner 123 determines that all the cameras are normal. On the other hand, if there is a difference equal to or larger than a threshold value between the amounts of movement estimated among the cameras, the determiner 123 determines that either the camera from which the smaller amounts of movement have been estimated or the camera from which the larger amounts of movement have been estimated has an abnormality. As to which of them is abnormal, the abnormal camera can be identified by comparing the amounts of movement with the actually observed information obtained from a sensor such as the speed sensor 41. With this modified example, where a camera misalignment is determined based on the difference among the amounts of movement estimated by the respective cameras, it is possible to determine a camera misalignment without the use of an external sensor.

5-4. Fourth Modified Example

FIG. 21 is a block diagram showing the configuration of a camera misalignment detection device 1A according to a modified example. The camera misalignment detection device 1A differs from the embodiments described above in that it further includes the shadow position estimator 124. The shadow position estimator 124 is a functional block implemented by the CPU in the controller 12 performing operational processing according to a program stored in the storage 13. The shadow position estimator 124 estimates the position of the shadow of the vehicle 7.

The estimation of the shadow position can be performed based on, for example, time of the day, season, whether, traveling direction of the vehicle 7, and the like. Information on season and whether can be acquired, for example, from a server device or the like via the Internet or the like. The traveling direction of the vehicle 7 can be acquired, for example, based on the information obtained from the steering angle sensor 42 via the communication bus 50.

FIG. 22 is a flow chart showing an example of the procedure for camera misalignment detection by the camera misalignment detection device 1A according to the modified example. Also in the camera misalignment detection device 1A, as in the example shown in FIG. 3, steps S1 and S2 are performed, so that, when the vehicle 7 is traveling straight at a low speed, the taken images for the derivation of optical flows OF are taken. When those taken images are taken, the shadow position is estimated by the shadow position estimator 124 (step S31).

When the shadow position is estimated, based on the estimated shadow position, the deriver 121 sets the extraction range for feature points FP (step S32). Specifically, the deriver 121 sets the extraction range for feature points FP at a position deviated from (not overlapping with) the estimated shadow position. Thereafter, the steps starting with step S3 shown in FIG. 3, 16, 17, or 20 are performed. With this configuration, it is possible to make the estimated values of the amounts of movement of the vehicle 7 based on optical flows OF less likely to become inaccurate under the influence of the shadow SH, and thus to determine a camera misalignment promptly and properly.

5-5. Modifications and Variations

The configurations of the embodiments and modified examples specifically described herein are merely illustrative of the present invention. The configurations of the embodiments and modified examples can be modified as necessary without departure from the technical idea of the present invention. Two or more of the embodiments and modified examples can be implemented in any possible combination.

The above description deals with configurations where the data used for the determination of a misalignment in the vehicle-mounted cameras 21 to 24 is collected when the vehicle 7 is traveling straight. This, however, is merely illustrative; instead, the data used for the determination of a misalignment in the vehicle-mounted cameras 21 to 24 can be collected when the vehicle 7 is not traveling straight. By use of the speed information obtained from the speed sensor 41 and the information obtained from the steering angle sensor 42, the actual amounts of movement of the vehicle 7 in the front-rear and left-right directions can be found accurately; it is thus possible to perform misalignment determination as described above even when the vehicle 7 is not traveling straight.

The above description deals with configurations where the estimator 122 calculates an estimated value of the amount of movement in the front-rear direction and an estimated value of the amount of movement in the left-right direction; instead, it can determine only one of them. However, in a configuration where only one of those estimated values is calculated, it is preferable that the estimator 122 calculate only an estimated value of the amount of movement in the front-rear direction. In that case, for example, for the amount of movement in the front-rear direction, the determiner 123 can compare the estimated value obtained in the estimator 122 with the value obtained from the actually observed information acquired in the sensor section 4 to determine a camera misalignment.

Instead, the estimator 122 can estimate the movement speed of the vehicle 7 based on the change of the image obtained from the front camera 21 mounted on the vehicle 7. The determiner 123 can compare the movement speed of the vehicle 7 that is estimated by the estimator 122 with the movement speed of the vehicle 7 that is obtained from the speed sensor 41 in the sensor section 4 to determine an abnormality in the front camera 21. An abnormality denotes what is referred to as a camera misalignment in the above description. If there is a given or larger deviation between the estimated movement speed of the vehicle 7 and the movement speed obtained from the speed sensor 41, the determiner 123 can determine an abnormality in the front camera 21. It is thus possible to detect a camera misalignment easily.

In a case where the vehicle 7 is furnished with a plurality of cameras (a front camera 21, a left side camera 23, a right side camera 24, and a rear camera 22), the estimator 122 can estimate the speed of the vehicle 7 for each of the plurality of cameras based on changes in the images obtained from the plurality of cameras respectively. The determiner 123 can, by comparing the movement speeds of vehicle 7 from the plurality of cameras respectively, determine any of the plurality of cameras that has an abnormality. For example, if only the movement speed based on the image of the front camera 21 differs from the movement speeds based on the images of the left-side, right-side, and rear cameras 22, 23, and 24, the determiner 123 can determine an abnormality in the front camera 21. It is thus possible to easily detect a misaligned camera from among the plurality of cameras.

What is claimed is:
1. An abnormality detection device, comprising:
an estimator configured to estimate an amount of movement of a mobile body based on an image taken by a camera mounted on the mobile body; and a determiner configured to determine an abnormality in the camera by obtaining
estimated information on the amount of movement of the mobile body as obtained in the estimator and
actually observed information on movement of the mobile body as detected by an external sensor, other than the camera, mounted on the mobile body.

2. The abnormality detection device according to claim 1, further comprising a deriver configured to derive an optical flow for each feature point, the optical flow being movement of the feature point between two images fed from the camera at a predetermined time interval,
wherein the estimator is configured to estimate the amount of movement of the mobile body on which the camera is mounted through statistical processing based on a plurality of optical flows.

3. The abnormality detection device according to claim 2, wherein
the estimated information includes estimated values of amounts of movement of the mobile body in front-rear and left-right directions respectively.

4. The abnormality detection device according to claim 3, wherein
the determiner is configured to determine that an abnormality is present in the camera when a difference between an estimated value obtained in the estimator and a value obtained based on the actually observed information is equal to or greater than a predetermined threshold value for at least one of the amount of movement of the mobile body in the front-rear direction, the amount of movement of the mobile body in the left-right direction, and a particular amount obtained based on the amounts of movement of the mobile body in the front-rear and left-right directions.

5. The abnormality detection device according to claim 2, wherein
the determiner is configured, on determining an abnormality in the camera based on the estimated information estimated by use of optical flows of feature points within a first region including a center of the image, to re-determine the abnormality in the camera based on the estimated information estimated by use of optical flows of feature points within a second region not including the center of the image.

6. The abnormality detection device according to claim 1, wherein
the actually observed information includes speed information on the mobile body fed to the determiner via a communication bus.

7. The abnormality detection device according to claim 1, wherein
the determiner is configured to determine an abnormality in the camera by use of information acquired when the mobile body is judged to be traveling straight by the external sensor.

8. The abnormality detection device according to claim 1, wherein
the determiner is configured to determine an abnormality in the camera by use of information acquired when the mobile body is judged to be traveling within a predetermined speed range by the external sensor.

9. The abnormality detection device according to claim 1, wherein
processing for calculating a cumulative value by adding up estimated values obtained in the estimator is performed, and
the determiner is configured to determine an abnormality in the camera based on the cumulative value.

10. The abnormality detection device according to claim 2, wherein
the estimator is configured to estimate the amount of movement after narrowing down the plurality of optical flows to optical flows to be used in the statistical processing.

11. The abnormality detection device according to claim 10, wherein
the actually observed information includes speed information on the mobile body, and
the estimator is configured to estimate the amount of movement after narrowing down the optical flows to be used in the statistical processing to optical flows that indicate amounts of movement within a certain range set based on the speed information.

12. The abnormality detection device according to claim 11, wherein
the estimator is configured to change a criterion for setting the certain range when a speed of the mobile body is outside a predetermined speed range as compared with when the speed of the mobile body is within the predetermined speed range.

13. The abnormality detection device according to claim 11, wherein
the determiner is configured to determine an abnormality in the camera based on an amount of movement of the mobile body as estimated in the estimator and an amount of movement of the mobile body as acquired from the speed information.

14. The abnormality detection device according to claim 10, wherein
the actually observed information includes traveling direction information on the mobile body, and
the estimator is configured, when the mobile body is judged, based on the traveling direction information, to have been traveling straight in a front-rear direction when the images for derivation of the optical flows were acquired, to estimate the amount of movement after excluding optical flows of which amounts of movement in a left-right direction are outside a predetermined range.

15. The abnormality detection device according to claim 10, wherein
the statistical processing includes processing for generating a histogram showing distribution of amounts of movement based on the plurality of optical flows, and
the estimator is configured to estimate the amount of movement by use of the histogram excluding amount-of-movement classes with frequencies lower than a predetermined value.

16. The abnormality detection device according to claim 10, wherein
the statistical processing includes processing for generating a histogram showing distribution of amounts of movement based on the plurality of optical flows, and
the estimator is configured to estimate the amount of movement by use of the histogram in amount-of-movement classes within a range set according to a degree of dispersion.

17. The abnormality detection device according to claim 10, wherein
the statistical processing includes processing for generating a histogram showing distribution of amounts of movement based on the plurality of optical flows, and the estimator is configured to estimate the amount of movement by use of the histogram in amount-of-movement classes within a range set based on previously performed processing for estimating the amount of movement of the mobile body.

18. The abnormality detection device according to claim 1, wherein
a deriver configured to derive an optical flow for each feature point, the optical flow being movement of the feature point between two images fed from the camera at a predetermined time interval,
wherein
the estimator is configured to estimate the amount of movement of the mobile body on which the camera is mounted based on a plurality of optical flows, and
the determiner is configured to halt abnormality determination processing for the camera when an abnormal-estimation state occurs where, despite the mobile body being recognized as moving based on the external sensor, the mobile body is estimated to be at rest based on the estimated information.

19. The abnormality detection device according to claim 18, wherein
the abnormal-estimation state includes a case where, despite the mobile body being recognized as moving based on the external sensor, the plurality of optical flows derived in the deriver include a predetermined or higher proportion of optical flows judged to involve no motion.

20. The abnormality detection device according to claim 18, wherein
the determiner is configured, when the abnormal-estimation state is detected at least once, to continue to halt the abnormality determination processing until traveling direction of the mobile body changes.

21. The abnormality detection device according to claim 20, wherein
when the traveling direction of the mobile body changes while the abnormality determination processing continues being halted, amount-of-movement estimation by the estimator and the abnormality determination processing by the determiner are performed based on a plurality of optical flows acquired after the change of the traveling direction.

22. The abnormality detection device according to claim 18, wherein
if, when the abnormal-estimation state occurs, a position of a shadow of the mobile body is recognizable, the abnormality determination processing is not halted, but amount-of-movement estimation by the estimator and the abnormality determination processing by the determiner are performed based on a plurality of optical flows derived by use of feature points located at positions deviated from the shadow.

23. The abnormality detection device according to claim 18, wherein
the camera comprises a plurality of cameras, and when the abnormal-estimation state is occurring for part of the plurality of cameras,
the abnormality determination processing is performed for the rest of the cameras for which the abnormal-estimation state is not occurring.

24. The abnormality detection device according to claim 18, further comprising a shadow position estimator configured to estimate a position of a shadow of the mobile body,
wherein the deriver is configured to set, based on the estimated shadow position, a range from which to extract the feature points.

25. An abnormality detection device, comprising:
an estimator configured to estimate an amount of movement of a mobile body based on images taken respectively by a plurality of cameras mounted on the mobile body; and
a determiner configured to determine a camera that has an abnormality by comparing, among the cameras, amount-of-movement information as obtained in the estimator.

26. An abnormality detection method for detecting an abnormality in a camera mounted on a mobile body, the method comprising:
an estimating step of estimating an amount of movement of the mobile body based on an image taken by the camera; and
a determining step of determining an abnormality in the camera by obtaining
estimated information on the amount of movement of the mobile body as obtained in an estimator and
actually observed information on movement of the mobile body as detected by an external sensor, other than the camera, mounted on the mobile body.

* * * * *